(12) United States Patent
Chen

(10) Patent No.: US 12,449,904 B2
(45) Date of Patent: Oct. 21, 2025

(54) THIN TACTILE REPRODUCTION DISPLAY PANEL AND DISPLAY APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Yuju Chen, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/247,367

(22) PCT Filed: Apr. 29, 2022

(86) PCT No.: PCT/CN2022/090304
§ 371 (c)(1),
(2) Date: Mar. 30, 2023

(87) PCT Pub. No.: WO2023/206370
PCT Pub. Date: Nov. 2, 2023

(65) Prior Publication Data
US 2025/0085781 A1    Mar. 13, 2025

(51) Int. Cl.
*G06F 3/01* (2006.01)
*G02F 1/1333* (2006.01)
*G06F 3/044* (2006.01)

(52) U.S. Cl.
CPC .......... *G06F 3/016* (2013.01); *G02F 1/13338* (2013.01); *G02F 1/133388* (2021.01); *G06F 3/0447* (2019.05)

(58) Field of Classification Search
CPC ........................................ G06F 3/016
See application file for complete search history.

(56) References Cited

U.S. PATENT DOCUMENTS 11,026,007 B2    6/2021  Noh et al.
2011/0043077 A1  2/2011  Yeh et al.
(Continued)

FOREIGN PATENT DOCUMENTS

CA    2941778 A    12/2016
CN    105335003 A   2/2016
(Continued)

OTHER PUBLICATIONS

European Search Report cited in European Patent Application No. EP 22 93 9219, dated Feb. 3, 2025.

*Primary Examiner* — Chun-Nan Lin
(74) *Attorney, Agent, or Firm* — LEASON ELLIS LLP

(57) ABSTRACT

A tactile reproduction display panel and a display apparatus including the same. The tactile reproduction display panel includes a display panel and a plurality of piezoelectric vibration devices; the display panel includes a base substrate and a plurality of pixel units on the base substrate; each of the piezoelectric vibration devices comprises a driver electrode structure and a piezoelectric layer, and the driver electrode structure is configured to drive the piezoelectric layer to deform so as to generate vibration; the display panel comprises a light exiting surface, the light exiting surface has a first side and a second side in a direction perpendicular to the base substrate, the light exiting surface is configured to emit light to the first side, and the plurality of piezoelectric vibration devices are at the second side of the light exiting surface.

11 Claims, 9 Drawing Sheets

(56) References Cited

U.S. PATENT DOCUMENTS

| | | |
|---|---|---|
| 2012/0075221 A1 | 3/2012 | Yasuda |
| 2013/0278561 A1 | 10/2013 | Yokoyama |
| 2015/0261046 A1 | 9/2015 | Miki et al. |
| 2018/0004294 A1 | 1/2018 | Eraslan et al. |
| 2018/0095574 A1 | 4/2018 | Kim et al. |
| 2018/0157366 A1 | 6/2018 | Du |
| 2018/0299958 A1 | 10/2018 | Wang et al. |
| 2019/0237703 A1 | 8/2019 | Kim et al. |
| 2019/0333971 A1* | 10/2019 | Kishimoto ............ G06F 3/0412 |
| 2019/0341433 A1* | 11/2019 | Im ......................... H10K 50/87 |
| 2020/0033946 A1 | 1/2020 | Chang et al. |
| 2020/0042130 A1 | 2/2020 | Pragada et al. |
| 2020/0209997 A1 | 7/2020 | Kim et al. |
| 2020/0213768 A1* | 7/2020 | Lee ........................ H04R 17/00 |
| 2020/0241642 A1 | 7/2020 | Oh et al. |
| 2020/0241678 A1 | 7/2020 | Yeom et al. |
| 2020/0294428 A1* | 9/2020 | Kim ..................... G06F 1/1637 |
| 2021/0055832 A1 | 2/2021 | Bagheri |
| 2021/0076135 A1 | 3/2021 | Choi et al. |
| 2021/0181847 A1 | 6/2021 | Noh et al. |
| 2021/0200366 A1* | 7/2021 | Bok ...................... H10K 59/873 |
| 2021/0396612 A1 | 12/2021 | Muhlbacher-Karrer et al. |
| 2022/0108669 A1 | 4/2022 | Lee et al. |

FOREIGN PATENT DOCUMENTS

| | | |
|---|---|---|
| CN | 105373228 A | 3/2016 |
| CN | 107885381 A | 4/2018 |
| CN | 108845710 A | 11/2018 |
| CN | 109478105 A | 3/2019 |
| CN | 110112175 A | 8/2019 |
| CN | 110806821 A | 2/2020 |
| CN | 111381672 A | 7/2020 |
| CN | 111384117 A | 7/2020 |
| CN | 111506187 A | 8/2020 |
| CN | 111506212 A | 8/2020 |
| CN | 112987912 A | 6/2021 |
| CN | 113130602 A | 7/2021 |
| EP | 3137964 A1 | 3/2017 |
| EP | 3671415 A1 | 6/2020 |
| TW | 202130196 A | 8/2021 |

\* cited by examiner

THIN TACTILE REPRODUCTION DISPLAY PANEL AND DISPLAY APPARATUS

CROSS-REFERENCE TO RELATED PATENT APPLICATIONS

This application is a U.S. National Stage Application under 35 U.S.C. § 371 of International Patent Application No. PCT/CN2022/090304, filed Apr. 29, 2022, which is incorporated by reference in its entirety.

TECHNICAL FIELD

Embodiments of the present disclosure relate to a tactile reproduction display panel and a display apparatus.

BACKGROUND

At present, Haptics is the focus of current technology development, the concept of Haptics is that with the help of haptic technology, electronic equipment manufacturers can create distinctive personalized haptic feedback for specific interactive experiences on their devices, thus providing consumers with more valuable and realistic unique experiences.

Haptics can be divided into two categories, one is vibration feedback and the other is tactile reproduction technology. Vibration feedback is to provide tactile feedback and vibration reminder for users by adding a linear motor to a redisplay device. Surface tactile reproduction technology can perceive the characteristics of objects by touching the screen with the skin (fingertips), and can achieve efficient and realistic interaction in multimedia terminals, which has great research value, so it has been widely concerned by researchers at home and abroad. In physical sense, the surface tactile sensation means interaction on the surface of the object and the surface of the skin (fingertip), and different friction forces are formed due to different surface structures. Therefore, different tactile sensations or tactile feelings can be simulated by controlling the surface friction.

SUMMARY

Embodiments of the present disclosure provide a tactile reproduction display panel and a display apparatus including the tactile reproduction display panel. The tactile reproduction display panel includes a display panel and a plurality of piezoelectric vibration devices; the display panel includes a base substrate and a plurality of pixel units on the base substrate; each of the piezoelectric vibration devices includes a driver electrode structure and a piezoelectric layer, and the driver electrode structure is configured to drive the piezoelectric layer to deform so as to generate vibration; the display panel includes a light exiting surface, the light exiting surface has a first side and a second side in a direction perpendicular to the base substrate, the light exiting surface is configured to emit light to the first side, and the plurality of piezoelectric vibration devices are at the second side of the light exiting surface. In the tactile reproduction display panel provided by the embodiment of the present disclosure, because the plurality of piezoelectric vibration devices are located at the second side of the light exiting surface, the tactile reproduction display panel can avoid adverse effects of the plurality of piezoelectric vibration devices on exiting light, thereby reducing the frame width and achieving a narrow frame design; in addition, because the plurality of piezoelectric vibration devices are located at the second side of the light exiting surface, they can be better integrated with the display panel, thereby reducing the thickness of the touch-control reproduction display panel. On the other hand, because the tactile reproduction display panel does not need to be provided with a cavity or an air layer, it can avoid the defects such as reduction of luminous efficiency and noise caused by the cavity or the air layer.

At least one embodiment of the present disclosure provides a tactile reproduction display panel, which includes: a display panel including a base substrate and a plurality of pixel units on the base substrate; and a plurality of piezoelectric vibration devices, each of the piezoelectric vibration devices includes a driver electrode structure and a piezoelectric layer, and the driver electrode structure is configured to drive the piezoelectric layer to deform so as to generate vibration; the display panel includes a light exiting surface, the light exiting surface has a first side and a second side in a direction perpendicular to the base substrate, the light exiting surface is configured to emit light to the first side, and the plurality of piezoelectric vibration devices are at the second side of the light exiting surface.

For example, in the tactile reproduction display panel provided by an embodiment of the present disclosure, the plurality of piezoelectric vibration devices are at a side of the base substrate away from the plurality of pixel units.

For example, in the tactile reproduction display panel provided by an embodiment of the present disclosure, the display panel includes a display area and a peripheral area surrounding the display area, and an orthographic projection of at least part of the plurality of piezoelectric vibration devices on the display panel is in the display area.

For example, in the tactile reproduction display panel provided by an embodiment of the present disclosure, orthographic projections of the plurality of piezoelectric vibration devices on the display panel are all in the display area.

For example, in the tactile reproduction display panel provided by an embodiment of the present disclosure, in the display area, at least part of the piezoelectric vibration devices is arranged in an array along a first direction and a second direction, and the first direction intersects with the second direction.

For example, in the tactile reproduction display panel provided by an embodiment of the present disclosure, the plurality of pixel units are arranged in an array along a row direction and a column direction, and the first direction is parallel to the row direction or the column direction.

For example, in the tactile reproduction display panel provided by an embodiment of the present disclosure, the display panel includes a display area and a peripheral area surrounding the display area, and an orthographic projection of the plurality of piezoelectric vibration devices on the display panel is in the peripheral area.

For example, the tactile reproduction display panel provided by an embodiment of the present disclosure further includes: a cured adhesive layer, between the plurality of piezoelectric vibration devices and the base substrate.

For example, in the tactile reproduction display panel provided by an embodiment of the present disclosure, the plurality of piezoelectric vibration devices are at a side of the base substrate close to the light exiting surface.

For example, in the tactile reproduction display panel provided by an embodiment of the present disclosure, the plurality of piezoelectric vibration devices are arranged side by side with at least part of the plurality of pixel units on the base substrate.

For example, in the tactile reproduction display panel provided by an embodiment of the present disclosure, the display panel includes a display area and a peripheral area surrounding the display area, and an orthographic projection of the plurality of piezoelectric vibration devices on the display panel is in the peripheral area.

For example, in the tactile reproduction display panel provided by an embodiment of the present disclosure, the display panel includes a display area and a peripheral area surrounding the display area, and an orthographic projection of at least part of the plurality of piezoelectric vibration devices on the display panel overlaps with the display area.

For example, in the tactile reproduction display panel provided by an embodiment of the present disclosure, the plurality of pixel units include a plurality of first pixel units and a plurality of second pixel units, the first pixel units and the plurality of piezoelectric vibration devices are arranged side by side on the base substrate, and the second pixel units are at a side of at least part of the plurality of piezoelectric vibration devices away from the base substrate.

For example, in the tactile reproduction display panel provided by an embodiment of the present disclosure, the display area includes a first display area and a second display area, the plurality of first pixel units are in the first display area, the plurality of second pixel units are in the second display area, and the second display area is at a periphery of the first display area.

For example, in the tactile reproduction display panel provided by an embodiment of the present disclosure, the display area includes a first display area and a second display area, the plurality of first pixel units are in the first display area, the plurality of second pixel units are in the second display area, and the second display area is surrounded by the first display area.

For example, the tactile reproduction display panel provided by an embodiment of the present disclosure further includes: a first insulation layer, at a side of the plurality of first pixel units and the plurality of piezoelectric vibration devices that are arranged side by side away from the base substrate, the plurality of second pixel units are at a side of the first insulation layer away from the plurality of piezoelectric vibration devices.

For example, the tactile reproduction display panel provided by an embodiment of the present disclosure further includes: a second insulation layer, at a side of the base substrate close to the light exiting surface, the plurality of piezoelectric vibration devices are between the base substrate and the second insulation layer, and the plurality of pixel units are at a side of the second insulation layer away from the base substrate.

For example, the tactile reproduction display panel provided by an embodiment of the present disclosure, further includes: a touch structure, at the first side of the light exiting surface, the touch structure includes a plurality of touch electrodes, and the plurality of touch electrodes are configured to detect a position of s touch operation.

For example, the tactile reproduction display panel provided by an embodiment of the present disclosure further includes: a first optical adhesive layer, between the display panel and the touch structure; a second optical adhesive layer, at a side of the touch structure away from the display panel; and an anti-reflective layer, at a side of the second optical adhesive layer away from the touch structure.

For example, in the tactile reproduction display panel provided by an embodiment of the present disclosure, the display panel includes an encapsulation layer, and the touch structure is directly on the encapsulation layer.

For example, in the tactile reproduction display panel provided by an embodiment of the present disclosure, at least one of the pixel units includes an organic light-emitting element, the organic light-emitting element includes a first electrode, a second electrode, and an organic light-emitting function layer between the first electrode and the second electrode.

For example, in the tactile reproduction display panel provided by an embodiment of the present disclosure, at least one of the pixel units includes a liquid crystal display unit, the liquid crystal display unit includes a pixel electrode, a common electrode, and a liquid crystal layer between the pixel electrode and the common electrode.

For example, in the tactile reproduction display panel provided by an embodiment of the present disclosure, the base substrate includes at least one selected from a group consisting of a glass base substrate, a silicon base substrate and a plastic base substrate.

At least one embodiment of the present disclosure further provides a tactile reproduction display panel, which includes: a display panel, including a base substrate and a plurality of pixel units on the base substrate; a touch structure, including a plurality of touch electrodes configured to detect a position of a touch operation; and a plurality of piezoelectric vibration devices, each of the plurality of piezoelectric vibration devices includes a driver electrode structure and a piezoelectric layer, and the driver electrode structure is configured to drive the piezoelectric layer to deform so as to generate vibration; the plurality of piezoelectric vibration devices are at a side of the touch structure away from the display panel, the display panel includes a display area and a peripheral area surrounding the display area, and an orthographic projection of the plurality of piezoelectric vibration devices on the display panel is in the peripheral area.

At least one embodiment of the present disclosure further provides a tactile reproduction display panel, which includes: a display panel, including a base substrate and a plurality of pixel units on the base substrate; a plurality of piezoelectric vibration devices; and a common base substrate, each of the plurality of piezoelectric vibration devices includes a driver electrode structure and a piezoelectric layer, and the driver electrode structure is configured to drive the piezoelectric layer to deform so as to generate vibration; the display panel and the plurality of piezoelectric vibration devices are on the common base substrate.

At least one embodiment of the present disclosure provides a display apparatus, which includes any one of the tactile reproduction display panels as described above.

BRIEF DESCRIPTION OF DRAWINGS

In order to clearly illustrate the technical solution of the embodiments of the present disclosure, the drawings of the embodiments will be briefly described. It is obvious that the described drawings in the following are only related to some embodiments of the present disclosure and thus are not construed as any limitation to the present disclosure.

DETAILED DESCRIPTION

Figure 1:
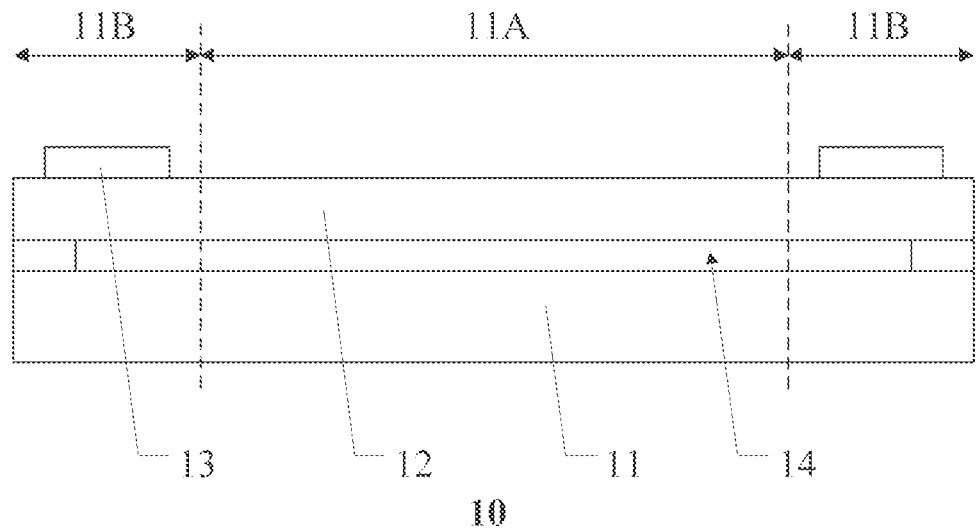
FIG. 1 is a schematic structural diagram of a tactile reproduction display panel.

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Also, the terms "comprise," "comprising." "include." "including." etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On." "under," "left." "right" and the like are only used to indicate relative position relationship, and when the position of the object which is described is changed, the relative position relationship may be changed accordingly.

Unless otherwise defined, features such as "parallel", "perpendicular" and "same" used in the embodiments of the present disclosure all include situations such as "parallel", "perpendicular", and "same" in the strict sense, and also include situations such as "approximately parallel", "approximately perpendicular", "approximately the same" that contain certain errors. For example, the above "approximately" may mean that difference of compared objects is within 10% of an average value of the compared objects, or within 5% of an average value of the compared objects. In a case that a number of components or elements is not specifically indicated below in the embodiments of the present disclosure, it refers to that the components or elements may be one or more, or may be understood as at least one. "At least one" means one or more, and "a plurality" means at least two. The "arranged on a same layer" in the embodiments of the present disclosure refers to a relationship between a plurality of film layers formed by a same material after going through a same step (for example, an one-step patterning process). The "same layer" here does not always refer to that the plurality of film layers have the same thickness or that the plurality of film layers have the same height in cross-sectional schematic diagrams.

In the technical field of surface tactile reproduction, vibration devices can be used as vibration sources to make the screen vibrate, so that the surface of the screen forms different friction forces, so that different tactile sensations or tactile sensations can be simulated. On the other hand, the piezoelectric vibration device is very suitable as a vibration device integrated on the screen because of its small size and good vibration effect.

FIG. 1 is a schematic structural diagram of a tactile reproduction display panel. As illustrated by FIG. 1, the tactile reproduction display panel 10 includes a liquid crystal display panel 11, a touch panel 12 and a piezoelectric vibration device 13; the liquid crystal display panel 11 includes a display area 11A and a peripheral area 11B surrounding the display area 11A; the touch panel 12 is located on the light exiting side of the liquid crystal display panel 11; the piezoelectric vibration device 13 is located at the side of the touch panel 12 away from the liquid crystal display panel 11. Because the piezoelectric vibration device 13 is opaque to light, the piezoelectric vibration device 13 can only be disposed in the peripheral area 11B of the liquid crystal display panel 11. In this case, in order to enable the touch panel 12 to have a better vibration effect, it is required to set a cavity 14 between the display panel 11 and the touch panel 12; for example, the thickness of the cavity 14 may be greater than 500 microns. However, on the one hand, because the piezoelectric vibration device 13 is arranged in the peripheral area of the liquid crystal display panel 11 and is opaque to light, it is easy to cause the width of the non-display area at the edge of the tactile reproduction display panel 10 to be large, making it difficult to achieve the narrow frame design, and the thickness of the tactile reproduction display panel 10 is also large due to the existence of the cavity 14 and the piezoelectric vibration device 13; on the other hand, because the cavity 14 is arranged between the display panel 11 and the touch panel 12, it is easy to cause total reflection of the light emitted from the display panel 11 at the interface between the cavity 14 and the display panel 11 or the interface between the cavity 14 and the touch panel 12, which reduces the light extraction efficiency. In addition, the sound generated by the piezoelectric vibration device 13 resonates in the cavity 14 for many times easily, which results in noise.

In one aspect, embodiments of the present disclosure provide a tactile reproduction display panel and a display apparatus including the tactile reproduction display panel. The tactile reproduction display panel includes a display panel and a plurality of piezoelectric vibration devices; the display panel includes a base substrate and a plurality of pixel units on the base substrate; each of the piezoelectric vibration devices includes a driver electrode structure and a piezoelectric layer, and the driver electrode structure is configured to drive the piezoelectric layer to deform so as to generate vibration; the display panel includes a light exiting surface, the light exiting surface has a first side and a second side in a direction perpendicular to the base substrate, the light exiting surface is configured to emit light to the first side, and the plurality of piezoelectric vibration devices are at the second side of the light exiting surface. In the tactile reproduction display panel provided by the embodiment of the present disclosure, because the plurality of piezoelectric vibration devices are located at the second side of the light exiting surface, the tactile reproduction display panel can avoid adverse effects of the plurality of piezoelectric vibration devices on exiting light, thereby reducing the frame width and achieving a narrow frame design; in addition, because the plurality of piezoelectric vibration devices are located at the second side of the light exiting surface, they can be better integrated with the display panel, thereby reducing the thickness of the touch-control reproduction display panel. On the other hand, because the tactile reproduction display panel does not need to be provided with a cavity or an air layer, it can avoid the defects such as reduction of luminous efficiency and noise caused by the cavity or the air layer.

On the other hand, the embodiment of the present disclosure further provides another tactile reproduction display panel and a display apparatus including the tactile reproduction display panel. The tactile reproduction display panel includes a display panel, a touch structure, and a plurality of piezoelectric vibration devices; the display panel includes a base substrate and a plurality of pixel units on the base substrate; the touch structure includes a plurality of touch electrodes configured to detect a position of a touch operation; each of the plurality of piezoelectric vibration devices includes a driver electrode structure and a piezoelectric layer, and the driver electrode structure is configured to drive the piezoelectric layer to deform so as to generate vibration; the plurality of piezoelectric vibration devices are at a side of the touch structure away from the display panel, the display panel includes a display area and a peripheral area surrounding the display area, and an orthographic projection of the plurality of piezoelectric vibration devices on the display panel is in the peripheral area. In the tactile reproduction display panel provided by the embodiment of the present disclosure, the plurality of piezoelectric vibration devices are located at the side of the touch structure away from the display panel, and the display panel includes a display area and a peripheral area surrounding the display area, so that the touch structure and the plurality of piezoelectric vibration devices are integrated on the display panel in the tactile reproduction display panel, thereby improving the vibration effect and reducing the thickness of the tactile reproduction display panel. On the other hand, because the tactile reproduction display panel does not need to be provided with a cavity or an air layer, it can avoid the defects such as reduction of luminous efficiency and noise caused by the cavity or the air layer.

On the other hand, the embodiment of the present disclosure further provides still another tactile reproduction display panel and a display apparatus including the tactile reproduction display panel. The tactile reproduction display panel includes a display panel, a plurality of piezoelectric vibration devices, and a common substrate; the display panel includes a base substrate and a plurality of pixel units on the base substrate; each of the plurality of piezoelectric vibration devices includes a driver electrode structure and a piezoelectric layer, and the driver electrode structure is configured to drive the piezoelectric layer to deform so as to generate vibration; the display panel and the plurality of piezoelectric vibration devices are on the common base substrate. In the tactile reproduction display panel provided by the embodiment of the present disclosure, because the display panel and the plurality of piezoelectric vibration devices are located on the common substrate, the tactile reproduction display panel can improve the vibration effect and also reduce the thickness of the tactile reproduction display panel. On the other hand, because the tactile reproduction display panel does not need to be provided with a cavity or an air layer, it can avoid the defects such as reduction of luminous efficiency and noise caused by the cavity or the air layer.

Hereinafter, the tactile reproduction display panel and display apparatus provided by the embodiments of the present disclosure will be described in detail with reference to the accompanying drawings.

Figure 2:
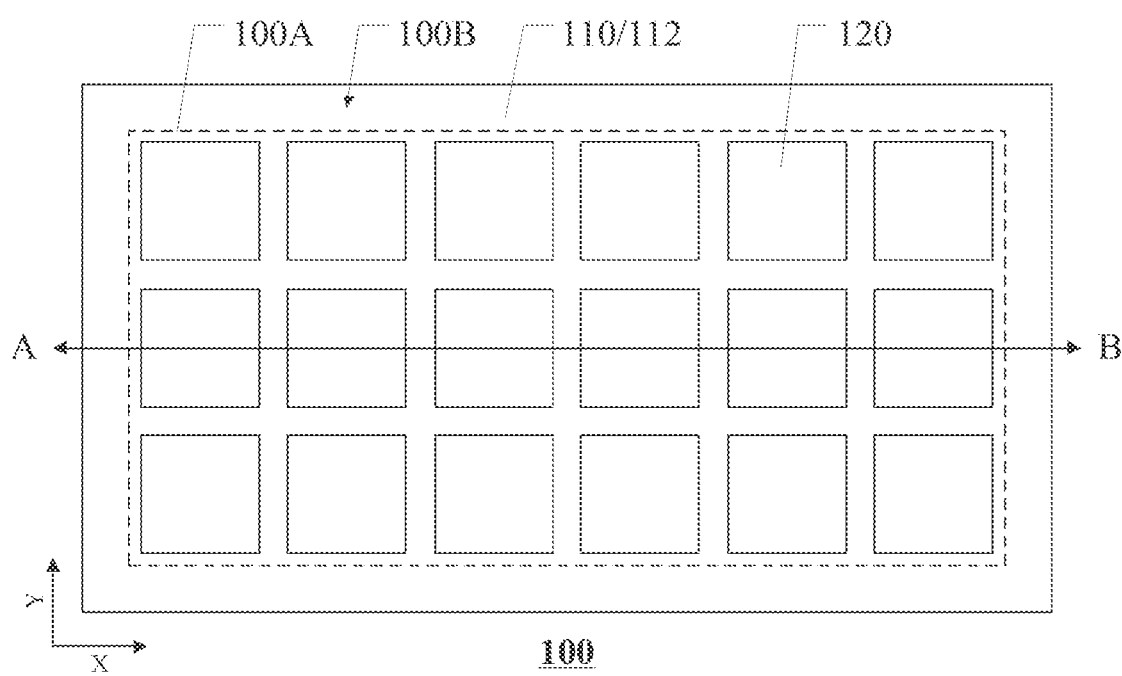
FIG. 2 is a schematic planar view of a tactile reproduction display panel provided by an embodiment of the present disclosure.
Figure 3A:
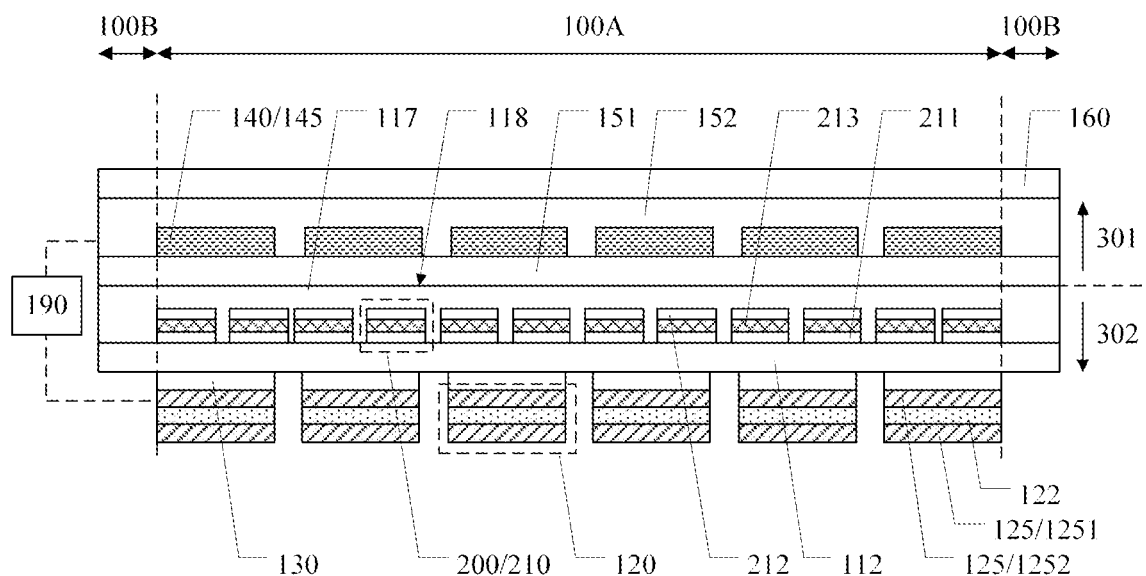
FIG. 3A is a schematic cross-sectional view of the tactile reproduction display panel taken along the line AB in FIG. 2 provided by an embodiment of the present disclosure.

FIG. 2 is a schematic planar view of a tactile reproduction display panel provided by an embodiment of the present disclosure. FIG. 3A is a schematic cross-sectional view of a tactile reproduction display panel taken along the line AB in FIG. 2 provided by an embodiment of the present disclosure.

As illustrated by FIG. 2 and FIG. 3A, the tactile reproduction display panel 100 includes a display panel 110 and a plurality of piezoelectric vibration devices 120; the display panel 110 includes a base substrate 112 and a plurality of pixel units 200 located on the base substrate 112; each piezoelectric vibration device 120 includes a driver electrode structure 125 and a piezoelectric layer 122, and the driver electrode structure 125 is configured to drive the piezoelectric layer 122 to deform to generate vibration; the display panel 110 includes a light exiting surface 118, the light exiting surface 118 has a first side 301 and a second side 302 in the direction perpendicular to the base substrate 112, the light exiting surface 118 is configured to emit light to the first side 301, and the plurality of piezoelectric vibration devices 120 are located at the second side 302 of the light exiting surface 118. It should be noted that the above-mentioned term "light exiting surface" is the surface from which the light generated or transmitted by the display panel finally exits; the above-mentioned term "first side" may be the side of the light exiting surface away from the base substrate, and the above-mentioned term "second side" may be the side of the light exiting surface close to the base substrate.

In the tactile reproduction display panel provided by the embodiment of the present disclosure, because the plurality of piezoelectric vibration devices are located at the second side of the light exiting surface, the tactile reproduction display panel can also avoid the adverse influence cause by the plurality of piezoelectric vibration devices on light exiting, thereby reducing the frame width and achieving the narrow frame design; in addition, because the plurality of piezoelectric vibration devices are located at the second side of the light exiting surface, they can be better integrated with the display panel, thereby reducing the thickness of the touch-control reproduction display panel. On the other hand, because the tactile reproduction display panel does not need to be provided with a cavity or an air layer, it can avoid the defects such as reduction of luminous efficiency and noise caused by the cavity or the air layer.

It is worth noting that the above-mentioned base substrate is relative to the light exiting surface, and is used to define the position of the piezoelectric vibration devices, which is not necessarily the initial substrate in the manufacturing process of the display panel, but also the last formed substrate or layer. For example, in the case that the display panel is an organic light-emitting diode display panel with bottom emission type, the surface of the initial substrate away from the light-emitting devices may be the light exiting surface, and the final formed cover plate or encapsulation layer may be the above-mentioned base substrate.

In some examples, as illustrated by FIG. 2 and FIG. 3A, the driver electrode structure 125 includes a first driving electrode 1251 and a second driving electrode 1252 that are respectively located on two sides of the piezoelectric layer 122 in the direction perpendicular to the base substrate 112. Thus, the second driving electrode 1251 and the second driving electrode 1252 can drive the piezoelectric layer 122 to vibrate.

In some examples, as illustrated by FIG. 2 and FIG. 3A, the plurality of piezoelectric vibration devices 120 are located at a side of the base substrate 112 away from the plurality of pixel units 200. That is, the plurality of piezoelectric vibration devices 120 are arranged on the back of the display panel 110. Therefore, the tactile reproduction display panel can prevent the plurality of piezoelectric vibration devices from adversely affecting the light-emitting display of the display panel.

In some examples, as illustrated by FIG. 2 and FIG. 3A, the display panel 110 includes a display area 110A and a peripheral area 110B surrounding the display area 110A, and the orthographic projection of at least part of the piezoelectric vibration device 120 on the display panel 110 overlaps with the display area 110A. In this way, the orthographic projection of the piezoelectric vibration device on the display panel overlaps with the display area, so that the piezoelectric vibration device can directly and better vibrate the display area of the tactile reproduction display panel; even if the piezoelectric vibration devices are arranged on the back of the display panel, a good vibration effect can still be obtained to achieve the simulation of different tactile sensations or tactile feelings. In addition, because the orthographic projection of piezoelectric vibration devices on the display panel overlaps with the display area, the tactile reproduction display panel can also be provided with piezoelectric vibration devices in the display area of the display panel, so that more piezoelectric vibration devices can be provided while avoiding the influence of piezoelectric vibration devices on the light-emitting display of the display panel, thereby improving the vibration effect and better achieving the simulation of different tactile sensations or tactile feelings.

It should be noted that the above-mentioned term "display area" refers to the area on the display panel where pixel units are arranged and perform the light-emitting display, and the above-mentioned term "peripheral area" refers to the area on the display panel where no pixel units are arranged; in addition, the above-mentioned terms "display area" and "peripheral area" divide the display panel in the horizontal direction, which can be used to define the position of piezoelectric vibration devices; therefore, the range defined by the "display area" in the present disclosure includes not only the light exiting side of the display panel, but also the back side of the display panel.

In some examples, as illustrated by FIG. 2 and FIG. 3A, the orthographic projections of the plurality of piezoelectric vibration devices 120 on the display panel 110 are all located in the display area 110A. Because the user's touch operation usually occurs in the display area, by arranging a plurality of piezoelectric vibration devices in the display area of the display panel, the tactile reproduction display panel can provide different vibration effects at different positions, so as to better achieve the simulation of different tactile sensations or tactile feelings.

In some examples, as illustrated by FIG. 2 and FIG. 3A, in the display area 110A, at least part of the piezoelectric vibration devices 120 are arranged in an array along a first direction X and a second direction Y, and the first direction X intersects with the second direction Y. Therefore, on the one hand, the tactile reproduction display panel can provide different vibration effects in different areas through piezoelectric vibration devices arranged in an array, so that better achieve the simulation of different tactile sensations or tactile feelings; on the other hand, the piezoelectric vibration devices arranged in array can also be controlled more conveniently.

In some examples, as illustrated by FIG. 2 and FIG. 3A, a plurality of pixel units 200 are arranged in an array along a row direction and a column direction, and the first direction X is parallel to the row direction or the column direction. Of course, the embodiments of the present disclosure include, but are not limited to this case, the above-mentioned first direction may form an included angle with the row direction, and the included angle is less than 90 degrees. It should be noted that the above row direction may be the extension direction of the gate line or the extension direction of the data line.

In some examples, as illustrated by FIG. 2 and FIG. 3A, the tactile reproduction display panel 100 further includes a cured adhesive layer 130, and the cured adhesive layer 130 is arranged between the piezoelectric vibration devices 120 and the base substrate 112, so that the piezoelectric vibration devices 120 can be fixed at the side of the base substrate 112 away from the plurality of pixel units 200. Because the cured adhesive layer can be fixed by a curing process (such as photocuring), the piezoelectric vibration devices can be fixed on the base substrate by the cured adhesive layer after the fabrication of the piezoelectric vibration devices is completed, thereby reducing the difficulty of the fabrication process of the tactile reproduction display panel and improving the production efficiency.

In some examples, the above-mentioned cured adhesive layer may be a photocurable adhesive layer, so that it can be cured by light at room temperature, therefore, on the one hand, the difficulty of manufacturing process of the cured adhesive layer can be reduced, on the other hand, adverse effects of high temperature on other devices can be avoided.

In some examples, the material of the cured adhesive layer may include epoxy resin. Of course, embodiments of the present disclosure include but are not limited to this case.

In some examples, as illustrated by FIG. 2 and FIG. 3A, the tactile reproduction display panel 100 further includes a touch structure 140; the touch structure 140 is located at the first side of the light exiting surface 118, that is, the touch structure 140 is located at the light exiting side of the display panel 110. The touch structure 140 includes a plurality of touch electrodes 145, the plurality of touch electrodes 145 are configured to detect the position of the touch operation. Therefore, the tactile reproduction display panel can detect the position of the touch operation, and can also control the piezoelectric vibration devices arranged in the display area array according to the position of the touch operation, so that the simulation of different tactile sensations or tactile feelings can be better achieved. It should be noted that the above-mentioned touch structure can adopt mutual capacitance touch technology or self-capacitance touch technology, and the embodiments of the present disclosure impose no limitation to this here.

In some examples, as illustrated by FIG. 2 and FIG. 3A, the tactile reproduction display panel 100 further includes a controller 190, the controller 190 is respectively connected with the piezoelectric vibration device 120 and the touch structure 140 in communication, so that the controller 190 can detect the position of the touch operation according to the signal output by the touch structure 140, and control the piezoelectric vibration devices according to the position of the touch operation. It should be noted that the above-mentioned term "connected with . . . in communication" includes the connection through wires, and may also include the connection through wireless communication.

In some examples, as illustrated by FIG. 2 and FIG. 3A, the tactile reproduction display panel 100 may include a first optical adhesive layer 151, a second optical adhesive layer 152 and an anti-reflective layer 160; the first optical adhesive layer 151 is located between the display panel 110 and the touch structure 140; the second optical adhesive layer 152 is located at the side of the touch structure 140 away from the display panel 110, and the anti-reflective layer 160 is located at the side of the second optical adhesive layer 152 away from the touch structure 140. Therefore, in the tactile reproduction display panel, the touch structure can be integrated on the display panel, thereby reducing the thickness of the tactile reproduction display panel; in addition, the tactile reproduction display panel can also avoid the reflection produced by the touch structure through the anti-reflection layer, thus avoiding the visualization of the touch structure.

In some examples, the anti-reflective layer may be a polarizer. Of course, the embodiments of the present disclosure include but are not limited to this case, and the above anti-reflective layer may also be other layers or structures with an anti-reflective function.

In some examples, as illustrated by FIG. 2 and FIG. 3A, at least one pixel unit 200 includes an organic light-emitting element 210; the organic light-emitting element 210 includes a first electrode 211, a second electrode 212, and an organic light-emitting function layer 213 located between the first electrode 211 and the second electrode 212. Therefore, because the display panel may be an organic light-emitting diode (OLED) display panel, the liquid crystal layer or the above-mentioned cavity or air layer can be avoided, so that the display panel can be better vibrated by the piezoelectric vibration devices, so as to better achieve the simulation of different tactile sensations. Of course, the embodiments of the present disclosure include but are not limited to this case, and the display panel may also be other types of display panels, such as a liquid crystal display panel. It should be noted that the above-mentioned organic light-emitting function layer may include not only a light-emitting layer that directly emits light, but also an auxiliary function layer for assisting light emission, such as a hole injection layer, a hole transport layer, an electron transport layer, and an electron injection layer.

In some examples, the above-mentioned base substrate may be at least one selected from a group consisting of a glass substrate, a silicon substrate and a plastic substrate.

Figure 3B:
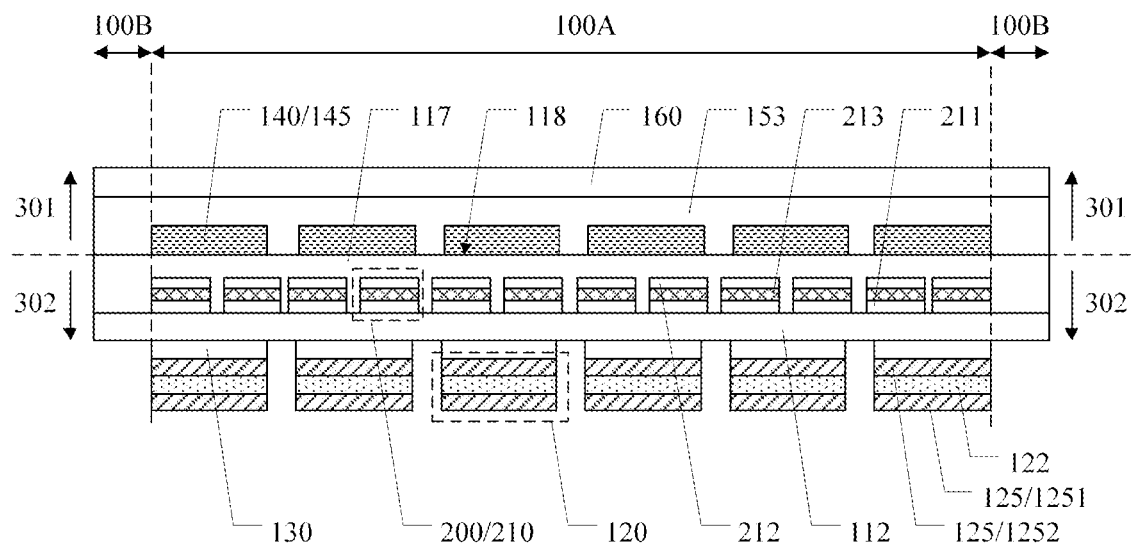
FIG. 3B is a schematic cross-sectional view of another tactile reproduction display panel provided by an embodiment of the present disclosure taken along the line AB in FIG. 2.

FIG. 3B is a schematic cross-sectional view of another tactile reproduction display panel provided by an embodiment of the present disclosure taken along the line AB in FIG. 2.

In some examples, as illustrated by FIGS. 2 and 3B, the display panel 110 includes an encapsulation layer 117, and the touch structure 140 is directly located on the encapsulation layer 117. Therefore, the integration level of the tactile reproduction display panel can be further improved and the thickness of the tactile reproduction display panel can be reduced.

In some examples, as illustrated by FIGS. 2 and 3B, the tactile reproduction display panel 100 may include a third optical adhesive layer 153 and an anti-reflective layer 160; the third optical adhesive layer 153 is located at the side of the touch structure 140 away from the display panel 110, and the anti-reflection layer 160 is located at the side of the third optical adhesive layer 153 away from the touch structure 140. Therefore, the tactile reproduction display panel can also avoid the reflection produced by the touch structure through the anti-reflection layer, thereby avoiding the visualization of the touch structure.

Figure 4:
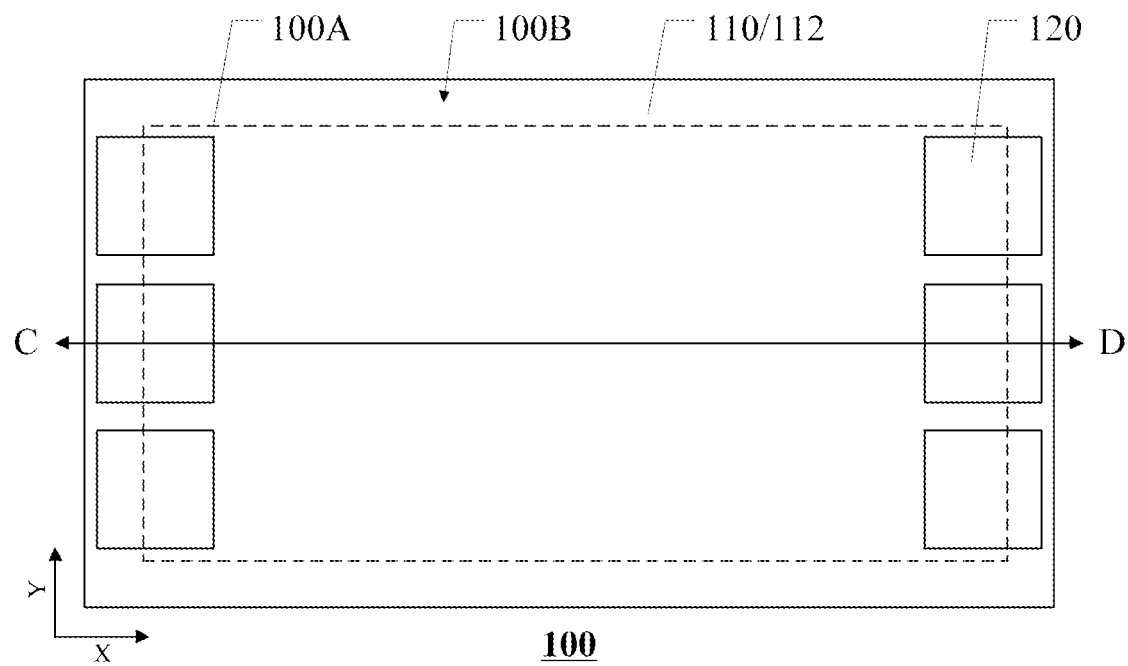
FIG. 4 is a schematic planar view of a tactile reproduction display panel provided by an embodiment of the present disclosure.
Figure 5:
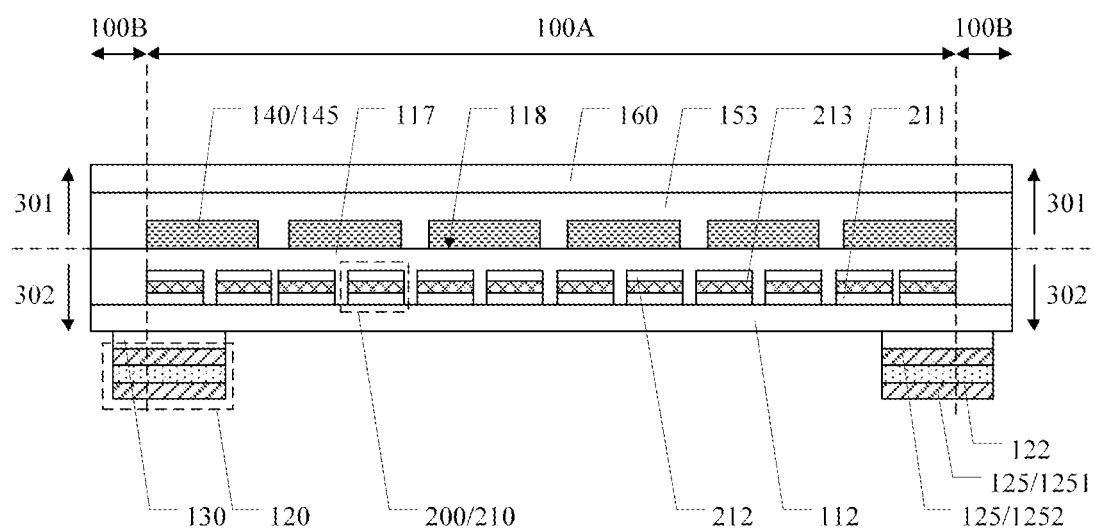
FIG. 5 is a schematic sectional view of the tactile reproduction display panel taken along the CD line in FIG. 4 provided by an embodiment of the present disclosure.

FIG. 4 is a schematic planar view of a tactile reproduction display panel provided by an embodiment of the present disclosure. FIG. 5 is a schematic sectional view of the tactile reproduction display panel taken along the line CD in FIG. 4 provided by an embodiment of the present disclosure.

As illustrated by FIG. 4 and FIG. 5, the tactile reproduction display panel 100 includes a display panel 110 and a plurality of piezoelectric vibration devices 120; the display panel 110 includes a base substrate 112 and a plurality of pixel units 200 located on the base substrate 112; each piezoelectric vibration device 120 includes a driver electrode structure 125 and a piezoelectric layer 122, and the driver electrode structure 125 is configured to drive the piezoelectric layer 122 to deform to generate vibration; the display panel 110 includes a light exiting surface 118, the light exiting surface 118 has a first side 301 and a second side 302 in the direction perpendicular to the base substrate 112, and the light exiting surface 118 is configured to emit light to the first side 301.

As illustrated by FIG. 4 and FIG. 5, the plurality of piezoelectric vibration devices 120 are located at the side of the base substrate 112 away from the plurality of pixel units 200. That is, the plurality of piezoelectric vibration devices 120 are arranged on the back of the display panel 110. The display panel 110 includes a display area 110A and a peripheral area 110B surrounding the display area 110A, and orthographic projection of the plurality of piezoelectric vibration devices 120 on the display panel 110 overlap with the peripheral area 110a. In this case, the plurality of piezoelectric vibration devices 120 are also located at the second side 302 of the light exiting surface 118.

In the tactile reproduction display panel provided by the embodiment of the present disclosure, because the plurality of piezoelectric vibration devices are located at the side of the base substrate away from a plurality of pixel units, the tactile reproduction display panel can also avoid the adverse influence caused by the piezoelectric vibration devices on light output, thereby reducing the frame width and achieving the narrow frame design; in addition, because the plurality of piezoelectric vibration devices are located at the side of the base substrate away from the plurality of pixel units, the piezoelectric vibration devices can be better integrated with the display panel, thereby reducing the thickness of the touch reproduction display panel. On the other hand, because the tactile reproduction display panel does not need to be provided with a cavity or an air layer, the defects such as reduction of luminous efficiency and noise caused by the cavity or the air layer can be avoided.

In some examples, as illustrated by FIG. 4 and FIG. 5, part of the orthographic projection of the plurality of piezoelectric vibration devices 120 on the display panel 110 is located in the display area 110A and part of the orthographic projection of the plurality of piezoelectric vibration devices 120 on the display panel 110 is located in the peripheral area 110B. Therefore, although the orthographic projection of the piezoelectric vibration devices on the base substrate overlaps with the display area, the size of the piezoelectric vibration device is not affected by the width of the peripheral area, and part of the piezoelectric vibration devices may be located in the display area.

In some examples, as illustrated by FIG. 4 and FIG. 5, the plurality of piezoelectric vibration devices 120 may be arranged along the second direction to form two rows of piezoelectric vibration devices 120, one row of piezoelectric vibration devices 120 is arranged on an edge at the side of the display panel 110, and the other row of piezoelectric vibration devices 120 is arranged on an edge at the other side of the display panel.

In some examples, as illustrated by FIG. 4 and FIG. 5, the tactile reproduction display panel 100 further includes a cured adhesive layer 130, and the cured adhesive layer 130 is arranged between the piezoelectric vibration devices 120 and the base substrate 112, so that the piezoelectric vibration devices 120 can be fixed at the side of the base substrate 112 away from the plurality of pixel units 200. Because the cured adhesive layer can be fixed by a curing process (such as photocuring), the piezoelectric vibration devices can be fixed on the base substrate by the cured adhesive layer after the fabrication of the piezoelectric vibration devices is completed, thereby reducing the difficulty of the fabrication process of the tactile reproduction display panel and improving the production efficiency.

In some examples, the above-mentioned cured adhesive layer may be a photocurable adhesive layer, so that it can be cured by light at room temperature, on the one hand, the difficulty of manufacturing process of the cured adhesive layer can be reduced, on the other hand, the adverse effects caused by high temperature on other devices can be avoided.

In some examples, the material of the cured adhesive layer may include epoxy resin. Of course, embodiments of the present disclosure include but are not limited to this case.

In some examples, as illustrated by FIG. 4 and FIG. 5, the tactile reproduction display panel 100 further includes a touch structure 140 and an encapsulation layer 117, and the touch structure 140 is directly located on the encapsulation layer 117. The touch structure 140 is located at the first side of the light exiting surface 118, that is, the touch structure 140 is located at the light exiting side of the display panel 110. The touch structure 140 includes a plurality of touch electrodes 145, the plurality of touch electrodes 145 are configured to detect the position of the touch operation. Therefore, in the tactile reproduction display panel, the touch structure can be integrated on the display panel, and detection of the position of the touch operation can be achieved. On the other hand, the tactile reproduction display panel can also control piezoelectric vibration devices arranged in the display area array according to the position of touch operation, so that the simulation of different tactile sensations or tactile feelings can be better achieved.

Of course, the embodiments of the present disclosure include but are not limited to this case, and the tactile reproduction display panel may also include a first optical adhesive layer, a second optical adhesive layer and an anti-reflective layer; the positional relationship and effect of the first optical adhesive layer, the second optical adhesive layer and the anti-reflective layer can be referred to the related descriptions of FIG. 3A, and are not described here again.

In some examples, as illustrated by FIG. 4 and FIG. 5, the above-mentioned display panel may also be an organic light-emitting diode (OLED) display panel. The specific structure and effect of the above-mentioned organic light-emitting diode (OLED) display panel can be seen in the relevant descriptions of FIG. 2 and FIG. 3A, and are not described here again.

Figure 6:
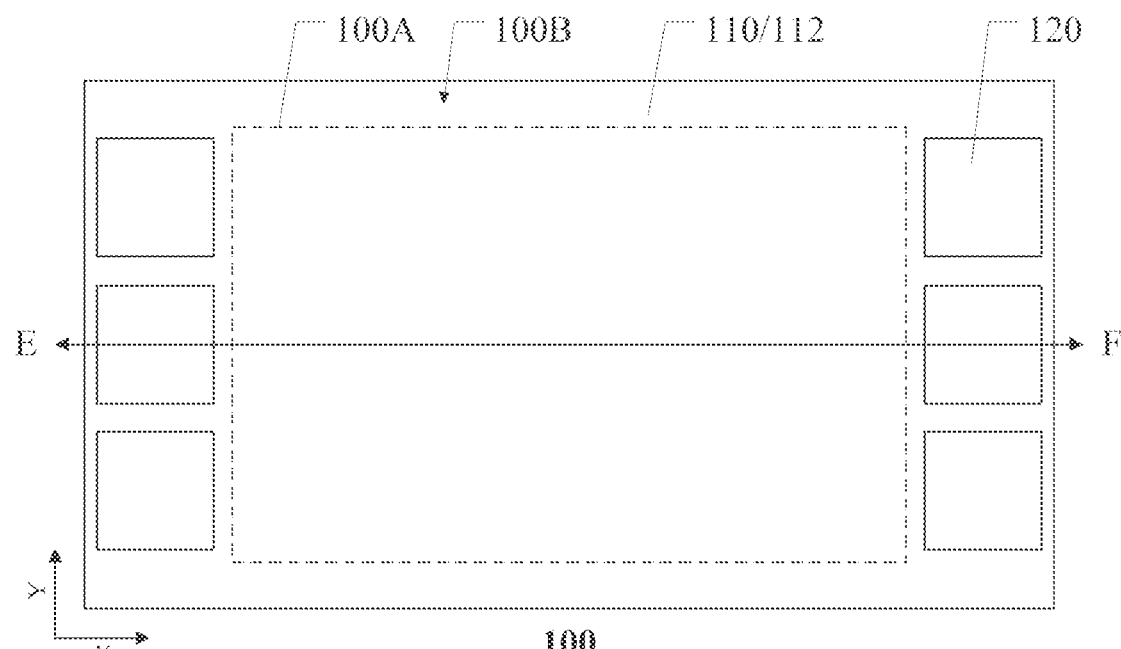
FIG. 6 is a schematic planar view of a tactile reproduction display panel provided by an embodiment of the present disclosure.
Figure 7:
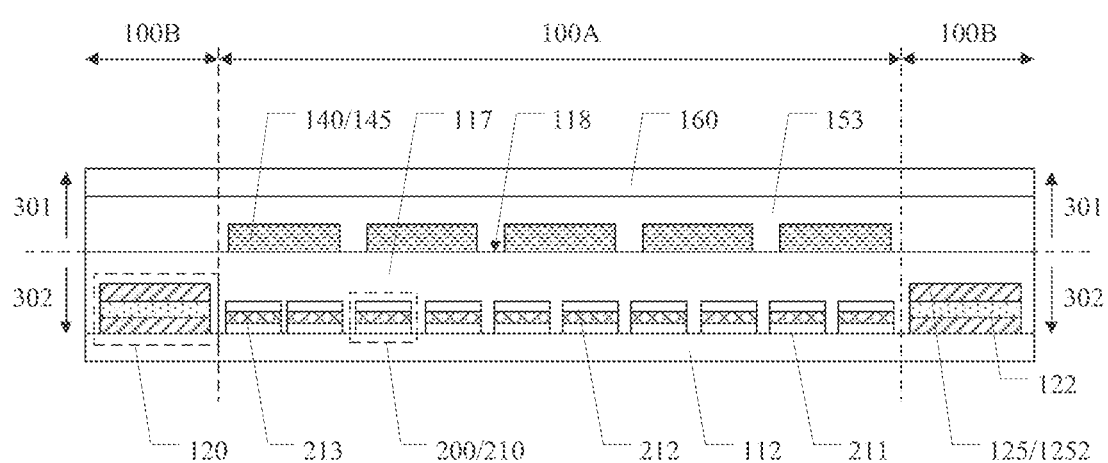
FIG. 7 is a schematic cross-sectional view of the tactile reproduction display panel taken along the EF line in FIG. 6 provided by an embodiment of the present disclosure.

FIG. 6 is a schematic planar view of a tactile reproduction display panel provided by an embodiment of the present disclosure. FIG. 7 is a schematic cross-sectional view of the tactile reproduction display panel taken along the line EF in FIG. 6 provided by an embodiment of the present disclosure.

As illustrated by FIG. 6 and FIG. 7, the tactile reproduction display panel 100 includes a display panel 110 and a plurality of piezoelectric vibration devices 120; the display panel 110 includes a base substrate 112 and a plurality of pixel units 200 located on the base substrate 112; each piezoelectric vibration device 120 includes a driver electrode structure 125 and a piezoelectric layer 122, and the driver electrode structure 125 is configured to drive the piezoelectric layer 122 to deform to generate vibration; the display panel 110 includes a light exiting surface 118, the light exiting surface 118 has a first side 301 and a second side 302 in the direction perpendicular to the base substrate 112, and the light exiting surface 118 is configured to emit light to the first side 301.

As illustrated by FIG. 6 and FIG. 7, the plurality of piezoelectric vibration devices 120 are located at the side of the base substrate 112 close to the light exiting surface 118; the plurality of piezoelectric vibration devices 120 are arranged side by side with at least part of the pixel units 120 on the base substrate 112; in this case, the plurality of piezoelectric vibration devices 120 are also located at the second side 302 of the light exiting surface 118. It should be noted that the above-mentioned term "arranged side by side" indicates that the plurality of piezoelectric vibration devices and at least part of the pixel units are arranged at the same side of the base substrate without overlapping each other; that is to say, the orthographic projection of the plurality of piezoelectric vibration devices on the base substrate does not overlap with the orthographic projection of at least part of the pixel units on the base substrate, or, the orthographic projection of the plurality of piezoelectric vibration devices on the base substrate are arranged at intervals with the orthographic projection of at least part of the pixel units on the base substrate.

In the tactile reproduction display panel provided by the embodiment of the present disclosure, because the plurality of piezoelectric vibration devices are located at the side of the base substrate close to the light exiting surface, that is, the piezoelectric vibration devices are arranged inside the display panel, the touch reproduction display panel can be better integrated with the display panel, and the thickness of the touch reproduction display panel can be reduced. On the other hand, because the tactile reproduction display panel does not need to be provided with a cavity or an air layer, the defects such as reduction of luminous efficiency and noise caused by the cavity or the air layer can be avoided.

In some examples, as illustrated by FIG. 6 and FIG. 7, the display panel 110 includes a display area 110A and a peripheral area 110B surrounding the display area 110A, and the orthographic projection of the plurality of piezoelectric vibration devices 120 on the display panel 110 is located in the peripheral area 110B. Although the plurality of piezoelectric vibration devices are located at the side of the base substrate close to the light exiting surface, the integration between the piezoelectric vibration devices and the display panel is high, and the distance between the piezoelectric vibration devices and the display area is close, therefore, the frame width can also be reduced in the tactile reproduction display panel and the narrow frame design is achieved.

In some examples, as illustrated by FIG. 6 and FIG. 7, the plurality of piezoelectric vibration devices 120 may be arranged along the second direction to form two rows of piezoelectric vibration devices 120, one row of piezoelectric vibration devices 120 is arranged at an edge at the side of the display panel 110, and the other row of piezoelectric vibration devices 120 is arranged at an edge at the other side of the display panel.

In some examples, as illustrated by FIG. 6 and FIG. 7, the tactile reproduction display panel 100 further includes a touch structure 140 and an encapsulation layer 117, and the touch structure 140 is directly located on the encapsulation layer 117. The touch structure 140 is located on the first side of the light exiting surface 118, that is, the touch structure 140 is located on the light exiting side of the display panel 110. The touch structure 140 includes a plurality of touch electrodes 145, the plurality of touch electrodes 145 are configured to detect the position of the touch operation. Therefore, in the tactile reproduction display panel, the touch structure can be integrated on the display panel, and detection of the position of the touch operation can be achieved. On the other hand, the tactile reproduction display panel can also control the piezoelectric vibration devices arranged in an array in the display area according to the position of touch operation, so that the simulation of different tactile sensations or tactile feelings can be better achieved.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer and the anti-reflective layer can be referred to the related description of FIG. 3A, and are not described here again.

In some examples, as illustrated by FIG. 4 and FIG. 5, the above display panel may also be an organic light-emitting diode (OLED) display panel. The specific structure and effect of the above-mentioned organic light-emitting diode (OLED) display panel can be seen in the related descriptions of FIG. 2 and FIG. 3A, and are not described here again.

Figure 8:
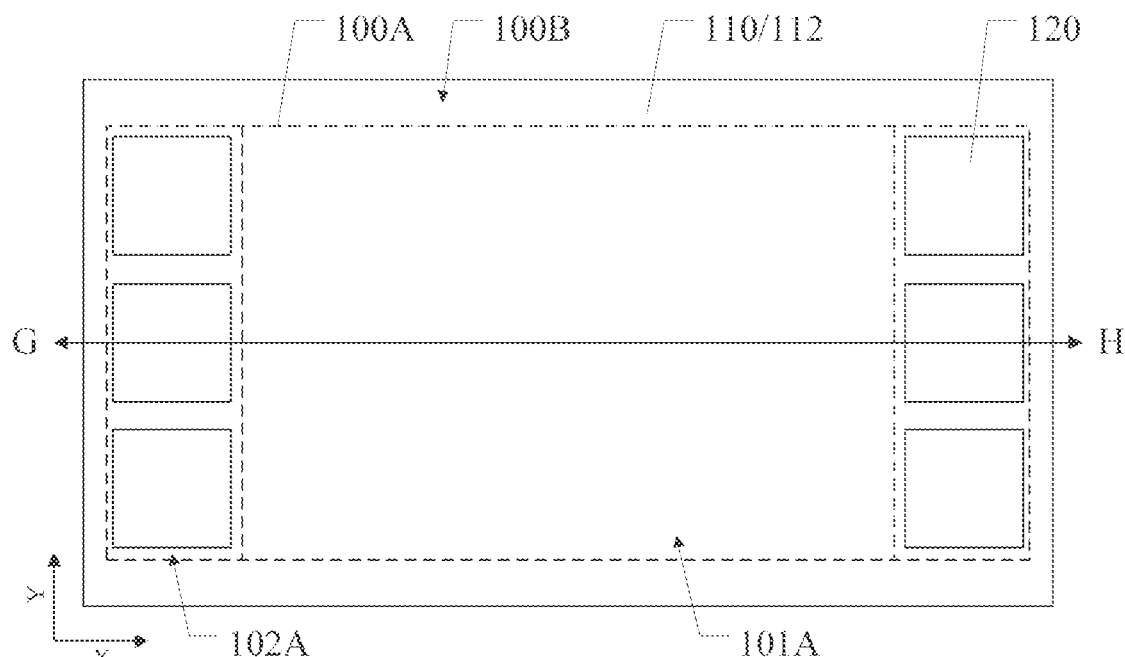
FIG. 8 is a schematic planar view of a tactile reproduction display panel provided by an embodiment of the present disclosure.
Figure 9A:
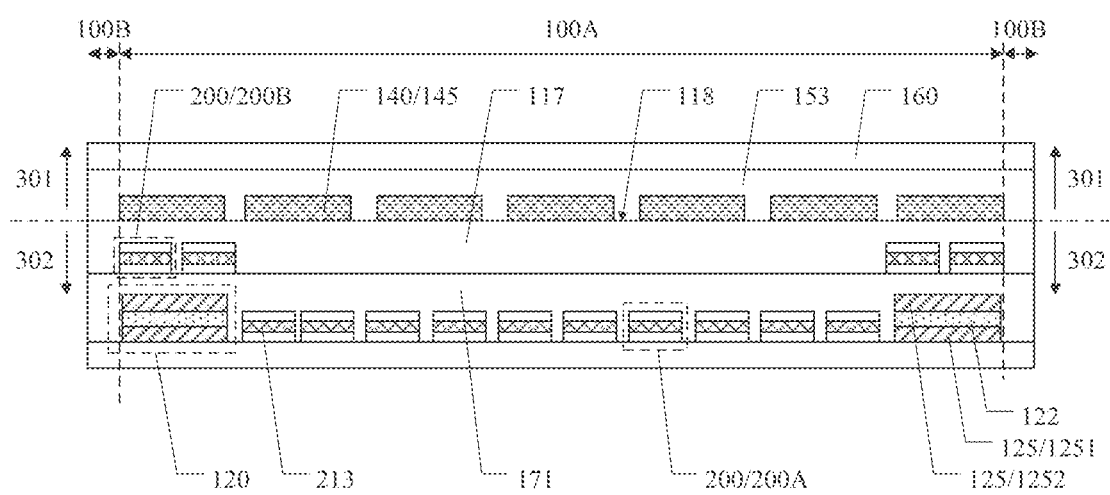
FIG. 9A is a schematic cross-sectional view of the tactile reproduction display panel taken along the GH line in FIG. 8 provided by an embodiment of the present disclosure.

FIG. 8 is a schematic planar view of a tactile reproduction display panel provided by an embodiment of the present disclosure. FIG. 9A is a schematic cross-sectional view of the tactile reproduction display panel taken along the line GH in FIG. 8 provided by an embodiment of the present disclosure.

As illustrated by FIG. 8 and FIG. 9A, the tactile reproduction display panel 100 includes a display panel 110 and a plurality of piezoelectric vibration devices 120; the display panel 110 includes a base substrate 112 and a plurality of pixel units 200 located on the base substrate 112; each piezoelectric vibration device 120 includes a driver electrode structure 125 and a piezoelectric layer 122, and the driver electrode structure 125 is configured to drive the piezoelectric layer 122 to deform to generate vibration; the display panel 110 includes a light exiting surface 118, the light exiting surface 118 has a first side 301 and a second side 302 in the direction perpendicular to the base substrate 112, and the light exiting surface 118 is configured to emit light to the first side 301.

As illustrated by FIG. 8 and FIG. 9A, the plurality of piezoelectric vibration devices 120 are located at the side of the base substrate 112 close to the light exiting surface 118. The plurality of piezoelectric vibration devices 120 are arranged side by side with at least part of the pixel units 120 on the base substrate 112; the display panel 110 includes a display area 110A and a peripheral area 110B surrounding the display area 110A, and the orthographic projection of at least part of the piezoelectric vibration device 120 on the display panel 110 is located in the display area 110a; in this case, the plurality of piezoelectric vibration devices 120 are also located at the second side 302 of the light exiting surface 118.

In the tactile reproduction display panel provided by the embodiment of the present disclosure, although the plurality of piezoelectric vibration devices are located at the side of the base substrate close to the light exiting surface, the plurality of piezoelectric vibration devices are also located at the second side of the light exiting surface, so that the display panel the tactile reproduction display panel can improve the integration between the piezoelectric vibration devices and the display panel, and meanwhile, prevent the piezoelectric vibration devices from adversely affecting the display of the display panel. In this case, the width of the peripheral area of the display panel can be regardless of the size of the piezoelectric vibration device, so can the frame width of the tactile reproduction display panel can be reduced and the narrow frame design is achieved. In addition, because the display panel and the piezoelectric vibration device can be better integrated together, the thickness of the touch reproduction display panel of the tactile reproduction display panel can also be reduced. On the other hand, because the tactile reproduction display panel does not need to be provided with a cavity or an air layer, the defects such as reduction of luminous efficiency and noise caused by the cavity or the air layer can be avoided.

In some examples, as illustrated by FIG. 8 and FIG. 9A, the plurality of pixel units 200 includes a plurality of first pixel units 200A and a plurality of second pixel units 200B, the plurality of first pixel units 200A and the plurality of second pixel units 200B are arranged side by side on the base substrate 112 with the plurality of piezoelectric vibration devices 200B, and the plurality of second pixel units 200B are located at the side of at least part of the piezoelectric vibration devices 120 away from the base substrate 112. By arranging the second pixel unit at the side of the piezoelectric vibration device away from the base substrate, the tactile reproduction display panel can improve the integration of the piezoelectric vibration device and the display panel, and meanwhile, prevent the piezoelectric vibration device from adversely affecting the display of the display panel.

It should be noted that the above-mentioned terms "arranged side by side" indicates that the plurality of piezoelectric vibration devices and the plurality of first pixel units are arranged on the same side of the base substrate without overlapping each other; that is, the orthographic projection of the plurality of piezoelectric vibration devices on the base substrate do not overlap with the orthographic projection of the plurality of first pixel units on the base substrate, or, the orthographic projection of the plurality of piezoelectric vibration devices on the base substrate are arranged at intervals with the orthographic projection of the plurality of first pixel units on the base substrate. However, because the plurality of second pixel units are located at the side of at least part of the piezoelectric vibration device away from the base substrate, the orthographic projection of the plurality of second pixel units on the base substrate overlaps with the orthographic projection of at least part of the piezoelectric vibration device on the base substrate.

In some examples, as illustrated by FIG. 8 and FIG. 9A, the display area 100A includes a first display area 101A and a second display area 102A, the plurality of first pixel units 200A are located in the first display area 101A, the plurality of second pixel units 200B are located in the second display area 102A, and the second display area 102A is at the periphery of the first display area 101A.

In some examples, as illustrated by FIG. 8 and FIG. 9A, the second display area 102A is located on two sides of the first display area 101A in the first direction X.

In some examples, as illustrated by FIG. 8 and FIG. 9A, the tactile reproduction display panel 100 further includes a first insulation layer 171, the first insulation layer 171 is located at the side of the plurality of first pixel units 200A and the plurality of piezoelectric vibration devices 120 that are arranged side by side away from the base substrate 112; then, the plurality of second pixel units 200B are located at the side of the first insulation layer 171 away from the plurality of piezoelectric vibration devices 120. Therefore, by arranging the first insulation layer and arranging the second pixel unit at the side of the piezoelectric vibration device away from the base substrate, the tactile reproduction display panel can improve the integration of the piezoelectric vibration devices and the display panel, and meanwhile, prevent the piezoelectric vibration devices from adversely affecting the display of the display panel.

In some examples, as illustrated by FIG. 8 and FIG. 9A, the plurality of piezoelectric vibration devices 120 can be arranged along the second direction to form two columns of piezoelectric vibration devices 120, one column of piezoelectric vibration devices 120 is arranged at an edge at one side of the display panel 110, and the other column of piezoelectric vibration devices 120 is arranged at an edge at the other side of the display panel.

In some examples, as illustrated by FIG. 8 and FIG. 9A, the tactile reproduction display panel 100 further includes a touch structure 140 and an encapsulation layer 117, and the touch structure 140 is directly located on the encapsulation layer 117. The touch structure 140 is located on the first side of the light exiting surface 118, that is, the touch structure 140 is located on the light exiting side of the display panel 110. The touch structure 140 includes a plurality of touch electrodes 145, the plurality of touch electrodes 145 are configured to detect the position of the touch operation. Therefore, the touch structure can be integrated on the display panel in the tactile reproduction display panel, and detection of the position of the touch operation can be achieved. On the other hand, the tactile reproduction display panel can also control piezoelectric vibration devices arranged in the display area array according to the position of touch operation, so that the simulation of different tactile sensations or tactile feelings can be better achieved.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer, and the anti-reflective layer can be referred to the related description of FIG. 3A, and are not described here again.

In some examples, as illustrated by FIG. 8 and FIG. 9A, the above display panel may also be an organic light-emitting diode (OLED) display panel. The specific structure and effect of the above-mentioned organic light-emitting diode (OLED) display panel can be seen in the related descriptions of FIG. 2 and FIG. 3A, and are not described here again.

Figure 9B:
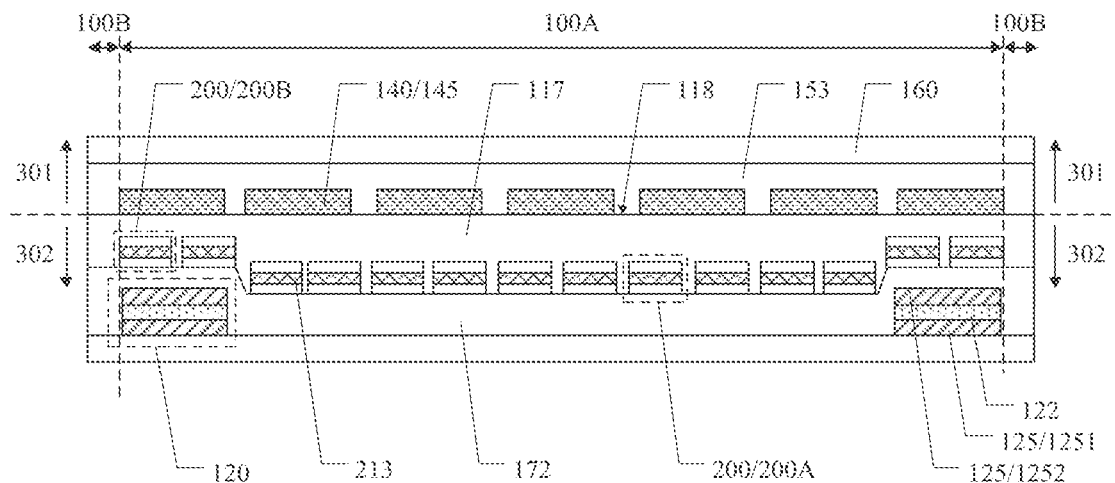
FIG. 9B is a schematic cross-sectional view of another tactile reproduction display panel taken along the GH line in FIG. 8 provided by an embodiment of the present disclosure.

FIG. 9B is a schematic cross-sectional view of another tactile reproduction display panel taken along the line GH in FIG. 8 provided by an embodiment of the present disclosure.

In some examples, as illustrated by FIG. 8 and FIG. 9B, the tactile reproduction display panel 100 further includes a second insulation layer 172, the second insulation layer 172 is located at the side of the plurality of piezoelectric vibration devices 120 away from the base substrate 112; then, the plurality of pixel units 200 are located at the side of the insulation layer 171 away from the plurality of piezoelectric vibration devices 120. Therefore, the tactile reproduction display panel can improve the integration of the piezoelectric vibration device and the display panel, and meanwhile, avoid the adverse influence caused by the piezoelectric vibration device on the display of the display panel.

In some examples, as illustrated by FIG. 8 and FIG. 9B, the plurality of piezoelectric vibration devices 120 are located between the base substrate 112 and the second insulation layer 172, and the plurality of pixel units 200 are located at the side of the second insulation layer 172 away from the base substrate 112.

In some examples, as illustrated by FIG. 8 and FIG. 9B, the tactile reproduction display panel 100 further includes a touch structure 140 and an encapsulation layer 117, and the touch structure 140 is directly located on the encapsulation layer 117. The touch structure 140 is located on the first side of the light exiting surface 118, that is, the touch structure 140 is located on the light exiting side of the display panel 110. The touch structure 140 includes a plurality of touch electrodes 145, the plurality of touch electrodes 145 are configured to detect the position of the touch operation. Therefore, the touch structure can be integrated on the display panel in the tactile reproduction display panel, and detection of the position of the touch operation can be achieved. On the other hand, the tactile reproduction display panel can also control piezoelectric vibration devices arranged in the display area array according to the position of touch operation, so that simulation of different tactile sensations or tactile feelings can be better achieved.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer, and the anti-reflective layer can be referred to the related description of FIG. 3A, and are not described here again.

In some examples, as illustrated by FIG. 8 and FIG. 9B, the above display panel may also be an organic light-emitting diode (OLED) display panel. The specific structure and effect of the above-mentioned organic light-emitting diode (OLED) display panel can be seen in the related descriptions of FIG. 2 and FIG. 3A, and are not described here again.

Figure 10:
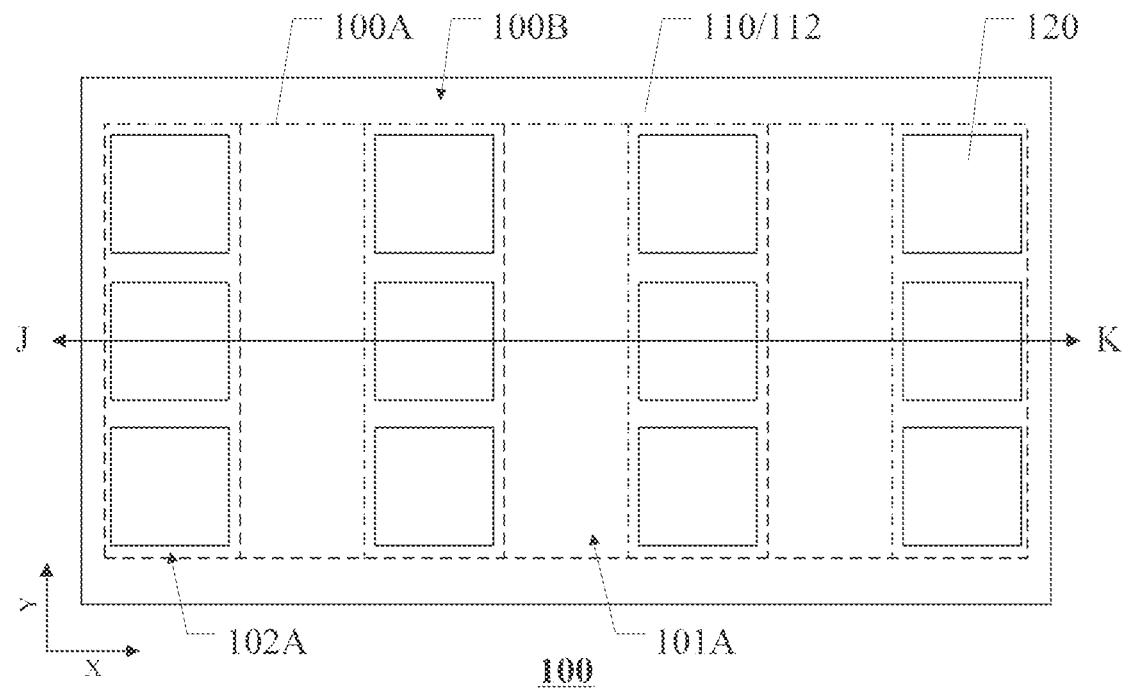
FIG. 10 is a schematic planar view of a tactile reproduction display panel provided by an embodiment of the present disclosure.
Figure 11:
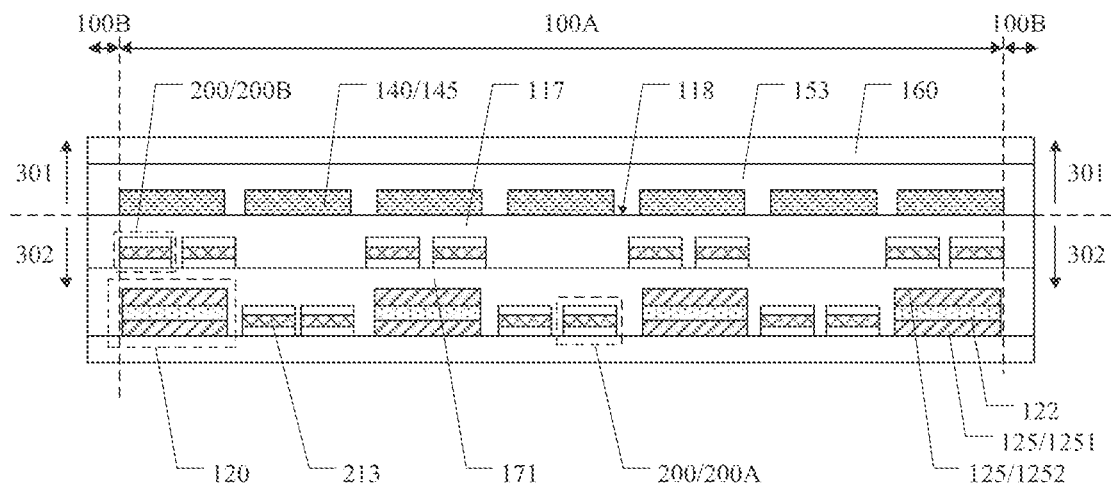
FIG. 11 is a schematic cross-sectional view of the tactile reproduction display panel taken along the line JK in FIG. 10 provided by an embodiment of the present disclosure.

FIG. 10 is a schematic planar view of a tactile reproduction display panel provided by an embodiment of the present disclosure. FIG. 11 is a schematic cross-sectional view of the tactile reproduction display panel taken along the line JK in FIG. 10 provided by an embodiment of the present disclosure.

As illustrated by FIG. 10 and FIG. 11, the tactile reproduction display panel 100 includes a display panel 110 and a plurality of piezoelectric vibration devices 120; the display panel 110 includes a base substrate 112 and a plurality of pixel units 200 located on the base substrate 112; each piezoelectric vibration device 120 includes a driver electrode structure 125 and a piezoelectric layer 122, and the driver electrode structure 125 is configured to drive the piezoelectric layer 122 to deform to generate vibration; the display panel 110 includes a light exiting surface 118, the light exiting surface 118 has a first side 301 and a second side 302 in the direction perpendicular to the base substrate 112, and the light exiting surface 118 is configured to emit light to the first side 301.

As illustrated by FIG. 10 and FIG. 11, the plurality of piezoelectric vibration devices 120 are located at the side of the base substrate 112 close to the light exiting surface 118. The plurality of piezoelectric vibration devices 120 are arranged side by side with at least part of the pixel units 120 on the base substrate 112; the display panel 110 includes a display area 110A and a peripheral area 110B surrounding the display area 110A, and the orthographic projection of at least part of the piezoelectric vibration devices 120 on the display panel 110 is located in the display area 110a; the plurality of pixel units 200 include a plurality of first pixel units 200A and a plurality of second pixel units 200B, the first pixel units 200A and the piezoelectric vibration devices 200B are arranged side by side on the base substrate 112, and the second pixel units 200B are located at the side of at least part of the piezoelectric vibration devices 120 away from the base substrate 112; the display area 100A includes a first display area 101A and a second display area 102A. The plurality of first pixel units 200A are located in the first display area 101A, and the plurality of second pixel units 200B are located in the second display area 101B, and the second display area 101B is surrounded by the first display area 101A. In this case, the plurality of piezoelectric vibration devices 120 are also located at the second side 302 of the light exiting surface 118.

In the tactile reproduction display panel provided by the embodiment of the present disclosure, by arranging the second pixel unit at the side of the piezoelectric vibration device away from the base substrate, the tactile reproduction display panel can improve the integration between the piezoelectric vibration devices and the display panel, and meanwhile, prevent the piezoelectric vibration devices from adversely affecting the display of the display panel. In this case, the width of the peripheral area of the display panel can be regardless of the size of the piezoelectric vibration device, therefore, the frame width of the tactile reproduction display panel can be reduced and the narrow frame design is achieved. In addition, because the display panel and the piezoelectric vibration device can be better integrated together, the thickness of the touch reproduction display panel can also be reduced. On the other hand, the second display area is surrounded by the first display area, instead of being arranged on two sides or on edges of the first display area, so that piezoelectric vibration devices can be arranged in an array in the display area, thus providing better vibration effect and achieving simulation of different tactile sensations better.

In some examples, as illustrated by FIG. 10 and FIG. 11, the tactile reproduction display panel 100 further includes a first insulation layer 171, the first insulation layer 171 is located at the side of the base substrate 112 close to the light exiting surface 118; the plurality of piezoelectric vibration devices 120 are located between the base substrate 112 and the first insulation layer 171, the first pixel unit 200A is located between the base substrate 112 and the first insulation layer 171, and the second pixel unit 200B is located at the side of the first insulation layer 171 away from the base substrate 112. Therefore, by arranging the second insulation layer and arranging the plurality of pixel units at the side of the second insulation layer away from the base substrate, the tactile display panel can improve the integration of the piezoelectric vibration devices and the display panel, and meanwhile, prevent the piezoelectric vibration device from adversely affecting the display of the display panel.

In some examples, as illustrated by FIG. 10 and FIG. 11, in the display area 110A, at least part of the piezoelectric vibration devices 120 are arranged in an array along a first direction X and a second direction Y, and the first direction X intersects with the second direction Y. Therefore, on the one hand, the tactile reproduction display panel can provide different vibration effects in different areas through piezoelectric vibration devices arranged in an array, so that the simulation of different tactile sensations or tactile feelings can be better achieved; on the other hand, the piezoelectric vibration devices arranged in array can also be controlled more conveniently.

In some examples, as illustrated by FIG. 10 and FIG. 11, the plurality of pixel units 200 are arranged in an array along a row direction and a column direction, and the first direction X is parallel to the row direction or the column direction. Of course, the embodiments of the present disclosure include, but are not limited to this case, the above-mentioned first direction may also form an included angle with the row direction, and the included angle is less than 90 degrees. It should be noted that the above row direction may be the extension direction of the gate line or the extension direction of the data line.

In some examples, as illustrated by FIG. 10 and FIG. 11, the above-mentioned tactile reproduction display panel 100 further includes a touch structure 140 and an encapsulation layer 117, and the touch structure 140 is directly located on the encapsulation layer 117. The touch structure 140 is located on the first side of the light exiting surface 118, that is, the touch structure 140 is located on the light exiting side of the display panel 110. The touch structure 140 includes a plurality of touch electrodes 145, the plurality of touch electrodes 145 are configured to detect the position of the touch operation. Therefore, the touch structure can be integrated on the display panel in the tactile reproduction display panel, and the tactile reproduction display panel can detect the position of the touch operation. On the other hand, the tactile reproduction display panel can also control piezoelectric vibration devices arranged in the display area array according to the position of touch operation, so that the simulation of different tactile sensations or tactile feelings can be better achieved.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer and the anti-reflective layer can be referred to the related description of FIG. 3A, and are not described here again.

In some examples, the tactile reproduction display panel may further include a controller, and the structure and positional relationship of the controller may be referred to the related descriptions of FIG. 2 and FIG. 3A, which are not described here again.

Figure 12:
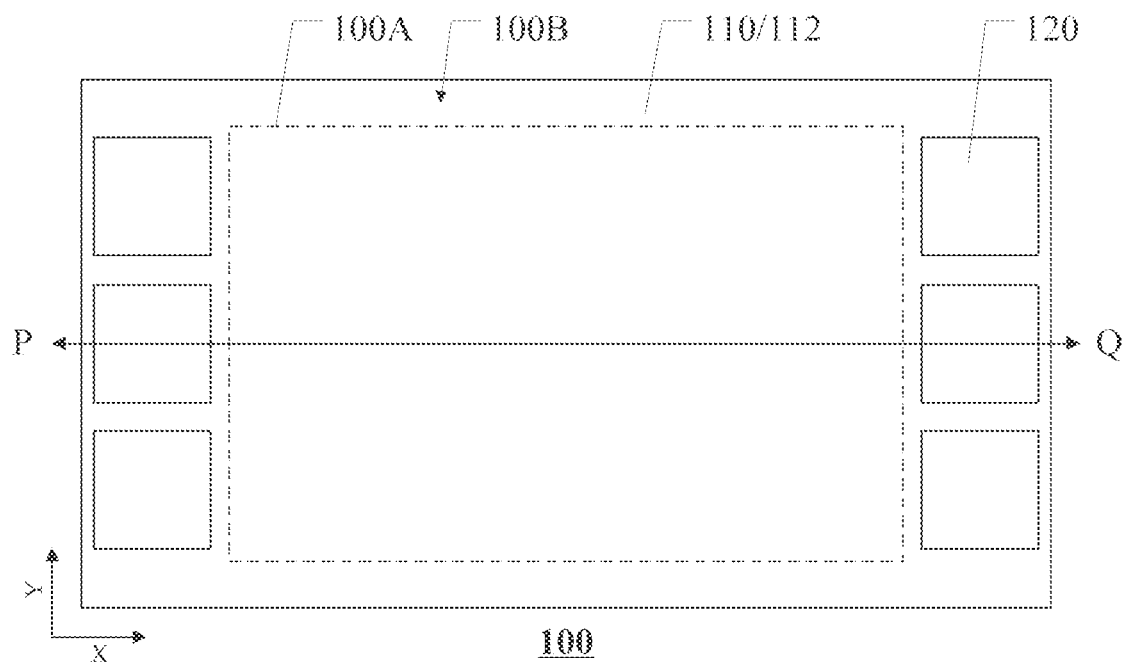
FIG. 12 is a schematic planar view of a tactile reproduction display panel provided by an embodiment of the present disclosure.
Figure 13:
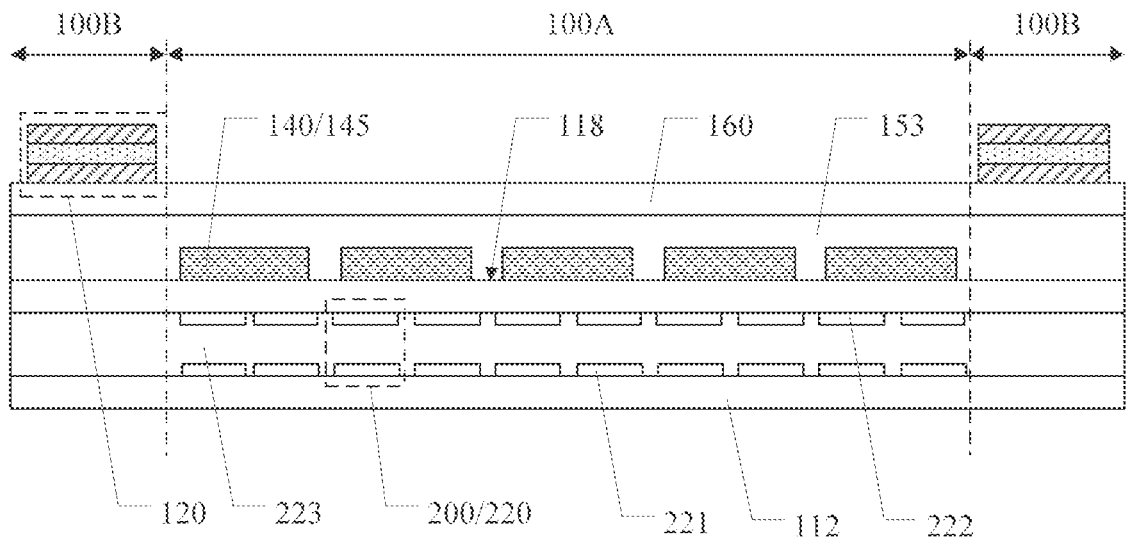
FIG. 13 is a schematic cross-sectional view of the tactile reproduction display panel taken along the line PQ in FIG. 12 provided by an embodiment of the present disclosure.

FIG. 12 is a schematic planar view of a tactile reproduction display panel provided by an embodiment of the present disclosure. FIG. 13 is a schematic cross-sectional view of the tactile reproduction display panel taken along the line PQ in FIG. 12 provided by an embodiment of the present disclosure.

As illustrated by FIG. 12 and FIG. 13, the tactile reproduction display panel 100 includes a display panel 110, a touch structure 140 and a plurality of piezoelectric vibration devices 120. The display panel 110 includes a base substrate 112 and a plurality of pixel units 200 located on the base substrate 112; the touch structure 140 includes a plurality of touch electrodes 145, the plurality of touch electrodes 145 are configured to detect the position of the touch operation; each piezoelectric vibration device 120 includes a driver electrode structure 125 and a piezoelectric layer 122, and the driver electrode structure 125 is configured to drive the piezoelectric layer 122 to deform to generate vibration; the plurality of piezoelectric vibration devices 120 are located at the side of the touch structure 140 away from the display panel 110. The display panel 110 includes a display area 100A and a peripheral area 100B surrounding the display area 100A, and the orthographic projection of the piezoelectric vibration devices 120 on the display panel 110 is located in the peripheral area 100.

In the tactile reproduction display panel provided by the embodiment of the present disclosure, because the plurality of piezoelectric vibration devices are located at the side of the touch structure away from the display panel, the piezoelectric vibration devices do not need to be provided with a cavity or an air layer, so that the defects such as reduction of luminous efficiency and noise caused by the cavity or the air layer can be avoided. On the other hand, the tactile reproduction display panel integrates the display panel, the touch structure and the piezoelectric vibration devices together, so that the thickness of the entire tactile reproduction display panel can be reduced.

In some examples, as illustrated by FIG. 12 and FIG. 13, the tactile reproduction display panel 100 further includes a touch structure 140 directly located on the display panel 110. Therefore, the thickness of the tactile reproduction display panel can be further reduced.

In some examples, as illustrated by FIG. 12 and FIG. 13, the tactile reproduction display panel 100 may include a third optical adhesive layer 153 and an anti-reflective layer 160; the third optical adhesive layer 153 is located at the side of the touch structure 140 away from the display panel 110, and the anti-reflection layer 160 is located at the side of the third optical adhesive layer 153 away from the touch structure 140. Therefore, the tactile reproduction display panel can also avoid the reflection produced by the touch structure through the anti-reflection layer, thereby avoiding the visualization of the touch structure.

In some examples, as illustrated by FIG. 12 and FIG. 13, the piezoelectric vibration device 120 may be directly arranged on the surface of the anti-reflective layer 160 away from the base substrate 112.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer and the anti-reflective layer can be referred to the related description of FIG. 3A, and are described here again.

In some examples, as illustrated by FIG. 12 and FIG. 13, at least one pixel unit 200 includes a liquid crystal display unit 220, the liquid crystal display unit 220 includes a pixel electrode 221, a common electrode 222, and a liquid crystal layer 223 located between the pixel electrode 221 and the common electrode 222. Therefore, the display panel may be a liquid crystal display panel. Of course, the embodiments of the present disclosure include but are not limited to this case, and the above display panel may also be replaced by an organic light-emitting diode (OLED) display panel.

In some examples, the display panel may also be an organic light-emitting diode (OLED) display panel. The specific structure and effect of the above-mentioned organic light-emitting diode (OLED) display panel can be referred to the relevant descriptions of FIG. 2 and FIG. 3A, and are not described here again.

Figure 14:
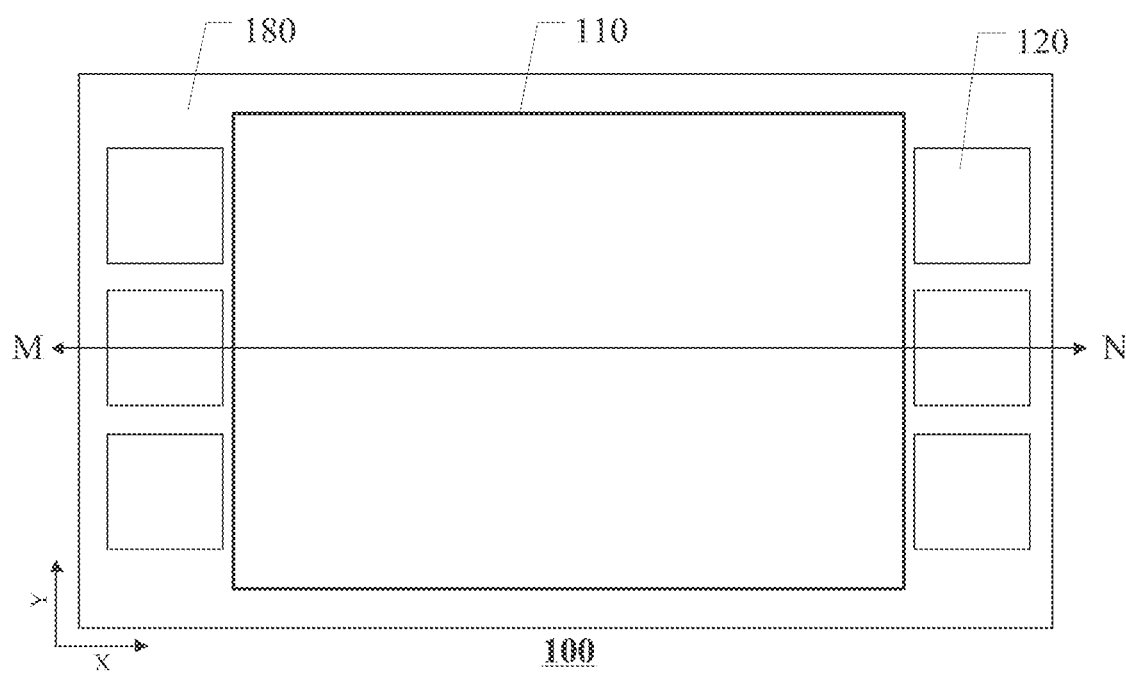
FIG. 14 is a schematic planar view of a tactile reproduction display panel provided by an embodiment of the present disclosure.
Figure 15:
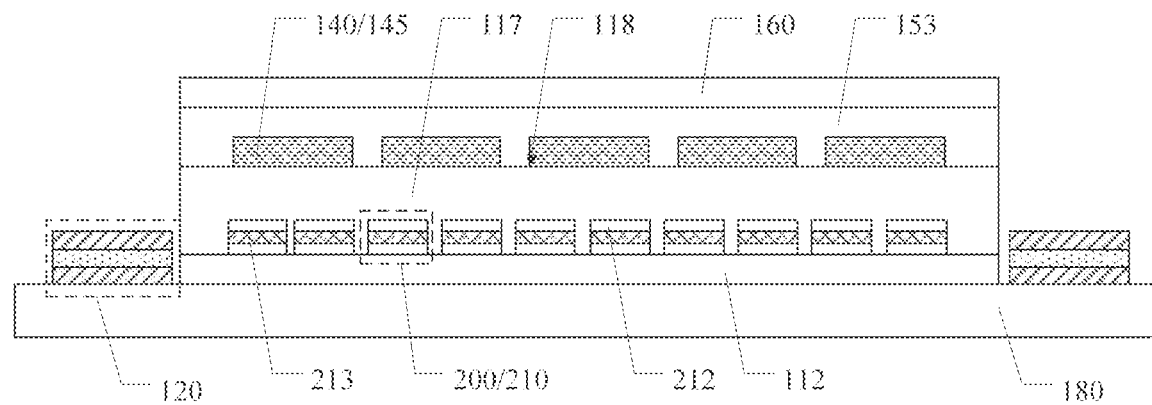
FIG. 15 is a schematic cross-sectional view of the tactile reproduction display panel taken along the line MN in FIG. 14 provided by an embodiment of the present disclosure.

FIG. 14 is a schematic planar view of a tactile reproduction display panel provided by an embodiment of the present disclosure. FIG. 15 is a schematic cross-sectional view of the tactile reproduction display panel taken along the line MN in FIG. 14 provided by an embodiment of the present disclosure.

As illustrated by FIG. 14 and FIG. 15, the tactile reproduction display panel 100 further includes a display panel 110, a plurality of piezoelectric vibration devices 120 and a common substrate 180; each piezoelectric vibration device 120 includes a driver electrode structure 125 and a piezoelectric layer 122, and the driver electrode structure 125 is configured to drive the piezoelectric layer 122 to deform to generate vibration; the display panel 110 and the plurality of piezoelectric vibration devices 120 are located on the common substrate 180.

In the tactile reproduction display panel provided by the embodiment of the present disclosure, because the display panel and the plurality of piezoelectric vibration devices are located on the common substrate, the piezoelectric vibration devices do not need to be provided with a cavity or an air layer, so that the defects such as reduction of luminous efficiency and noise caused by the cavity or the air layer can be avoided. On the other hand, because the display panel and the plurality of piezoelectric vibration devices are located on the common substrate, the thickness of the tactile reproduction display panel can be reduced; in addition, the tactile reproduction display panel can better deform the display panel through piezoelectric vibration devices to generate vibration, and improve the vibration effect.

In some examples, as illustrated by FIG. 14 and FIG. 15, the above-mentioned tactile reproduction display panel 100 further includes a touch structure 140 and an encapsulation layer 117, and the touch structure 140 is directly located on the encapsulation layer 117. Therefore, the thickness of the tactile reproduction display panel can be further reduced.

Of course, the embodiment of the present disclosure includes but is not limited to this case, and the tactile reproduction display panel may also include a first optical adhesive layer, a second optical adhesive layer and an anti-reflective layer; the positional relationship and effect of the first optical adhesive layer, the second optical adhesive layer and the anti-reflective layer can be referred to the related description of FIG. 3A, and are not described here again.

In some examples, as illustrated by FIG. 14 and FIG. 15, the above-mentioned display panel may also be an organic light-emitting diode (OLED) display panel. The specific structure and effect of the above-mentioned organic light-emitting diode (OLED) display panel can be seen in the relevant descriptions of FIG. 2 and FIG. 3A, and are not described here again.

Figure 16:
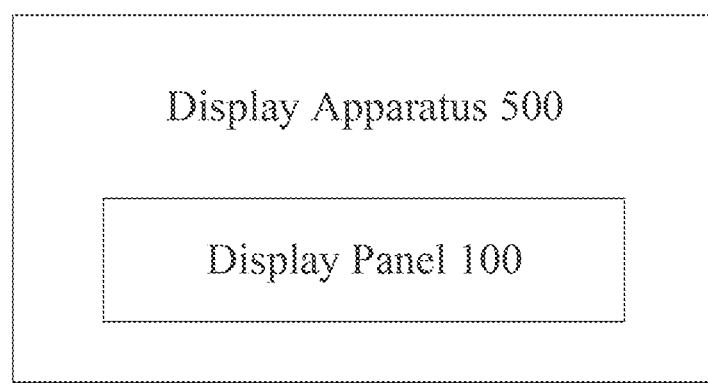
FIG. 16 is a schematic diagram of a display apparatus provided by an embodiment of the present disclosure.

FIG. 16 is a schematic diagram of a display apparatus provided by an embodiment of the present disclosure. As illustrated by FIG. 16, the display apparatus 500 includes the tactile reproduction display panel 100 described above. Therefore, the display apparatus also has the beneficial technical effects corresponding to the technical effects of the included tactile reproduction display panel. These beneficial technical effects can be referred to the related descriptions of the tactile reproduction display panel, which are not repeated here.

In some examples, the display apparatus can be an electronic product with display function, such as a mobile phone, a tablet computer, a display, a TV set, a navigator and the like.

The following points required to be explained:
(1) the drawings of the embodiments of the present disclosure only relate to the structures related to the embodiments of the present disclosure, and other structures can refer to the general design.
(2) The various components or structures in the drawings are not strictly drawn to scale, and the dimensions of the various components or structures may be exaggerated or reduced for the sake of clarity, but these should not be used to limit the scope of the present disclosure.
(3) without conflict, the embodiments of the present disclosure and the features in the embodiments may be combined with each other.

The above is only the specific embodiment of the present disclosure, but the protection scope of the present disclosure is not limited thereto. Any person familiar with the technical field can easily think of changes or substitutions within the technical scope disclosed in the present disclosure, and they should be included in the protection scope of the present disclosure. Therefore, the scope of protection of the present disclosure should be based on the scope of protection of the claims.

The invention claimed is:

1. A tactile reproduction display panel, comprising:
a display panel comprising a base substrate and a plurality of pixel units on the base substrate; and
a plurality of piezoelectric vibration devices,
wherein each of the piezoelectric vibration devices comprises a driver electrode structure and a piezoelectric layer, and the driver electrode structure is configured to drive the piezoelectric layer to deform so as to generate vibration;
the display panel comprises a light exiting surface, the light exiting surface has a first side and a second side in a direction perpendicular to the base substrate, the light exiting surface is configured to emit light to the first side, and the plurality of piezoelectric vibration devices are at the second side of the light exiting surface,
the plurality of piezoelectric vibration devices are at a side of the base substrate close to the light exiting surface,
the plurality of piezoelectric vibration devices are arranged side by side with at least part of the plurality of pixel units on the base substrate,
the display panel comprises a display area and a peripheral area surrounding the display area, and an orthographic projection of at least part of the plurality of piezoelectric vibration devices on the display panel overlaps with the display area,
the plurality of pixel units comprise a plurality of first pixel units and a plurality of second pixel units, the first pixel units and the plurality of piezoelectric vibration devices are arranged side by side on the base substrate, and the second pixel units are at a side of at least part of the plurality of piezoelectric vibration devices away from the base substrate.

2. The tactile reproduction display panel according to claim 1, wherein orthographic projections of the plurality of piezoelectric vibration devices on the display panel are all in the display area.

3. The tactile reproduction display panel according to claim 1, wherein, in the display area, at least part of the piezoelectric vibration devices is arranged in an array along a first direction and a second direction, and the first direction intersects with the second direction.

4. The tactile reproduction display panel according to claim 1, wherein the display area comprises a first display area and a second display area, the plurality of first pixel units are in the first display area, the plurality of second pixel units are in the second display area, and the second display area is at a periphery of the first display area.

5. The tactile reproduction display panel according to claim 1, wherein the display area comprises a first display area and a second display area, the plurality of first pixel units are in the first display area, the plurality of second pixel units are in the second display area, and the second display area is surrounded by the first display area.

6. The tactile reproduction display panel according to claim 1, further comprising:
a first insulation layer, at a side of the plurality of first pixel units and the plurality of piezoelectric vibration devices that are arranged side by side away from the base substrate,
wherein the plurality of second pixel units are at a side of the first insulation layer away from the plurality of piezoelectric vibration devices.

7. The tactile reproduction display panel according to claim 1, further comprising:
an insulation layer, at a side of the base substrate close to the light exiting surface,
wherein the plurality of piezoelectric vibration devices are between the base substrate and the insulation layer, and the plurality of pixel units are at a side of the insulation layer away from the base substrate.

8. The tactile reproduction display panel according to claim 1, further comprising:
a touch structure, at the first side of the light exiting surface,
wherein, the touch structure comprises a plurality of touch electrodes, and the plurality of touch electrodes are configured to detect a position of s touch operation.

9. A display apparatus, comprising the tactile reproduction display panel according to claim 1.

10. A tactile reproduction display panel, comprising:
a display panel, comprising a base substrate and a plurality of pixel units on the base substrate;

a plurality of piezoelectric vibration devices; and
a common base substrate,
wherein each of the plurality of piezoelectric vibration devices comprises a driver electrode structure and a piezoelectric layer, and the driver electrode structure is configured to drive the piezoelectric layer to deform so as to generate vibration; the display panel and the plurality of piezoelectric vibration devices are arranged side by side on the common base substrate, the base substrate of the display panel is arranged on the common base substrate, and the plurality of piezoelectric vibration devices are arranged a lateral side of the base substrate of the display panel.

11. A tactile reproduction display panel, comprising:
a display panel comprising a base substrate and a plurality of pixel units on the base substrate; and
a plurality of piezoelectric vibration devices,
wherein each of the piezoelectric vibration devices comprises a driver electrode structure and a piezoelectric layer, and the driver electrode structure is configured to drive the piezoelectric layer to deform so as to generate vibration;

the display panel comprises a light exiting surface, the light exiting surface has a first side and a second side in a direction perpendicular to the base substrate, the light exiting surface is configured to emit light to the first side, and the plurality of piezoelectric vibration devices are at the second side of the light exiting surface, the plurality of piezoelectric vibration devices are located at a side of the base substrate close to the light exiting surface;

the plurality of piezoelectric vibration devices are arranged side by side with at least part of the pixel units on the base substrate, the display panel comprises a display area and a peripheral area surrounding the display area, and an orthographic projection of the plurality of piezoelectric vibration devices on the display panel is in the peripheral area.

* * * * *